(12) United States Patent
Um et al.

(10) Patent No.: US 7,495,715 B2
(45) Date of Patent: Feb. 24, 2009

(54) THIN FILM TRANSISTOR ARRAY PANEL

(75) Inventors: Yoon-Sung Um, Yongin-si (KR); Jae-Jin Lyu, Gwangju-si (KR); Hak-Sun Chang, Yongin-si (KR); Seung-Hoo Yoo, Seongnam-si (KR); Hyun-Wuk Kim, Yongin-si (KR); Hee-Wook Do, Suwon-si (KR); Yeon-Ju Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 405 days.

(21) Appl. No.: 11/481,780

(22) Filed: Jul. 6, 2006

(65) Prior Publication Data
US 2007/0035675 A1   Feb. 15, 2007

(30) Foreign Application Priority Data
Aug. 9, 2005   (KR) .................. 10-2005-0072749

(51) Int. Cl.
*G02F 1/136* (2006.01)
(52) U.S. Cl. ............... 349/43; 349/38; 349/39
(58) Field of Classification Search ............. 385/38–39, 385/43–47
See application file for complete search history.

(56) References Cited

U.S. PATENT DOCUMENTS

2008/0204613 A1* 8/2008 Kim et al. .................. 349/33
2008/0204615 A1* 8/2008 Shin et al. .................. 349/38

FOREIGN PATENT DOCUMENTS

| JP | 07-191336 | 7/1995 |
|---|---|---|
| KR | 1020020069570 A | 9/2002 |
| KR | 1020020085234 A | 11/2002 |
| KR | 1020020085244 A | 11/2002 |
| KR | 1020020089979 A | 11/2002 |
| KR | 1020020091700 A | 12/2002 |

\* cited by examiner

*Primary Examiner*—Hemang Sanghavi
(74) *Attorney, Agent, or Firm*—F. Chau & Associates, LLC

(57) ABSTRACT

A liquid crystal display that includes a substrate; a plurality of gate lines formed on the substrate; a plurality of common electrodes formed on the substrate and made of a transparent material; a plurality of data lines intersecting the gate lines; a plurality of thin film transistors connected to the data lines and the gate lines; and a plurality of pixel electrodes connected to the thin film transistors and overlapping the common electrodes. The pixel electrodes include a first sub-pixel electrode separated by a distance from a second sub-pixel electrode.

10 Claims, 21 Drawing Sheets

THIN FILM TRANSISTOR ARRAY PANEL

CROSS-REFERENCE TO RELATED PATENT APPLICATION

This application claims priority to Korean Patent Application No. 2005-0072749, filed on Aug. 9, 2005, in the Korean Intellectual Property Office, the disclosure of which is incorporated by reference herein.

BACKGROUND OF THE INVENTION (a) Technical Field

The present disclosure relates to a thin film transistor array panel.

(b) Discussion of the Related Art

A liquid crystal display (LCD) is one of the most widely used flat panel displays. An LCD includes two panels and a liquid crystal (LC) layer interposed between the two panels. The panels contain field generating electrodes such as pixel electrodes and a common electrode. One such LCD, provides a plurality of pixel electrodes arranged in a matrix at one panel and a common electrode covering an entire surface of the other panel. The LCD displays images by applying voltages to the field-generating electrodes to generate an electrical field in the LC layer. The electrical field effects the orientation of LC molecules in the LC layer, thereby adjusting the polarization of incident light.

In a vertical alignment (VA) mode LCD, the long axes of the LC molecules are perpendicular to the panels in the absence of an electric field. This type of display has a high contrast ratio.

A PVA (patterned vertically aligned) mode LCD, which is really a modified VA mode LCD with cutouts added to the field generating electrodes, an IPS (in-plane switching) mode LCD, and a PLS (plane to line switching) mode LCD have been developed to obtain wider viewing angles.

However, PLS mode and IPS mode LCDs suffer from an off-pixel defect. Since the common electrode and the pixel electrodes are formed on the same substrate, they are frequently shorted with each other, causing a pixel to erroneously display black.

SUMMARY OF THE INVENTION

According to an exemplary embodiment of the invention, there is provided a thin film transistor array panel which includes a substrate, a plurality of gate lines formed on the substrate, a plurality of common electrodes formed on the substrate and made of a transparent material, a plurality of data lines intersecting the gate lines, a plurality of thin film transistors connected to the data lines and the gate lines, and a plurality of pixel electrodes connected to the thin film transistors and overlapping the common electrodes, wherein the pixel electrodes at least include first and second sub-pixel electrodes that are separated from each other.

In an exemplary embodiment of the invention, the thin film transistors include first and second drain electrodes respectively connected to first and second pixel electrodes. The first and second sub-pixel electrodes include a plurality of branch electrodes having a parallel arrangement.

The common electrodes may have a continuous surface between the branch electrodes. The branch electrodes of the first and second sub-pixel electrodes may be disposed in different areas. The first and second sub-pixel electrodes may be disposed at both sides of the gate lines. The branch electrodes of the first and second sub-pixel electrodes may be alternatively arranged with each other. The branch electrodes of the first and second sub-pixel electrodes may be curved with respect to the gate lines or the data lines, and they may have an inverse symmetry with the center lines of the common electrodes parallel to the gate lines.

The thin film transistor array panel may further include a plurality of common electrode lines connecting the common electrodes.

BRIEF DESCRIPTION OF THE DRAWINGS

The present invention will become more apparent by describing in detail exemplary embodiments thereof with reference to the attached drawings, in which.

DETAILED DESCRIPTION OF EXEMPLARY EMBODIMENTS

Figure 1:
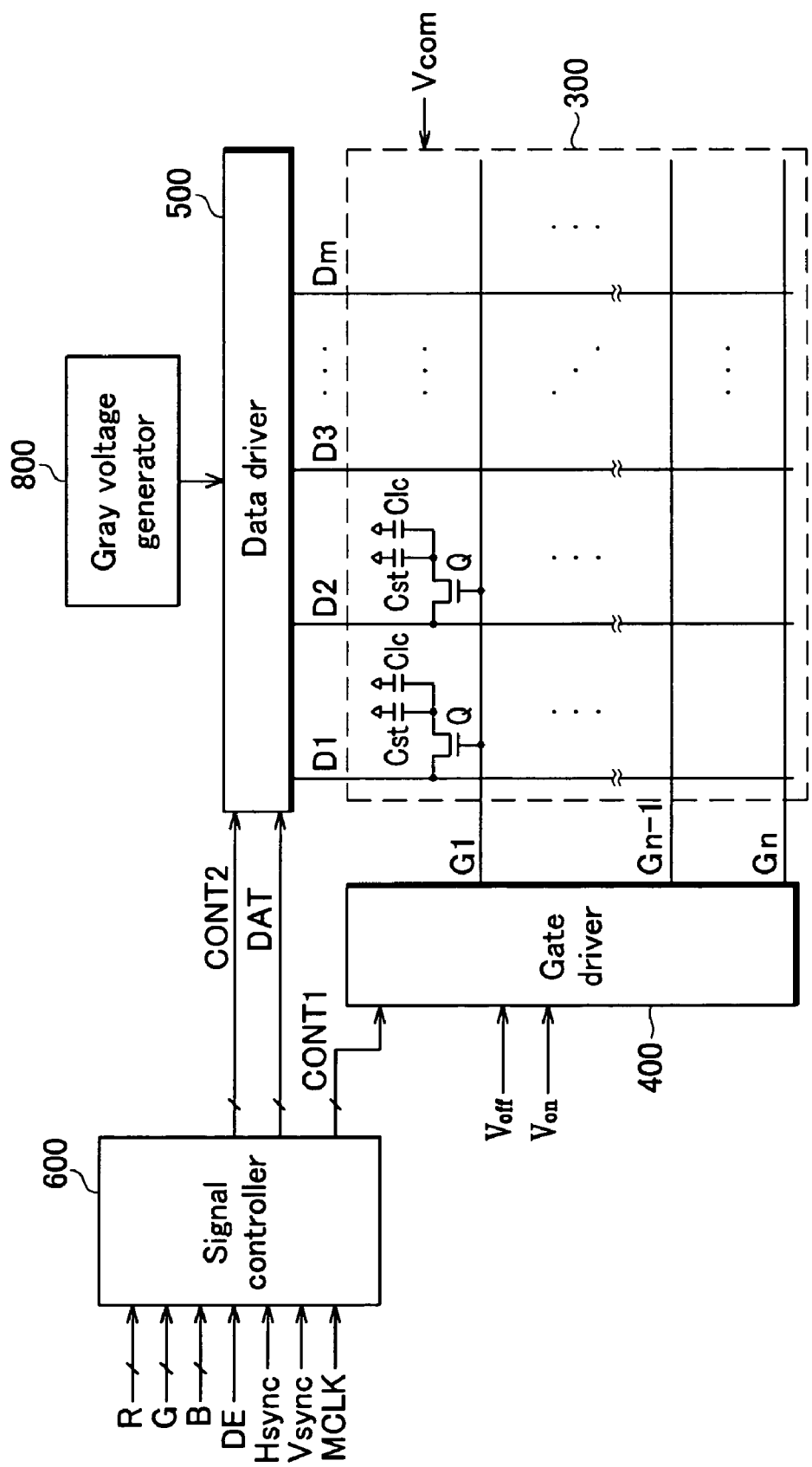
FIG. 1 is a block diagram of an LCD according to an exemplary embodiment of the present invention.

Hereinafter, exemplary embodiments of the present invention will be described in detail with reference to the attached drawings. In the drawings, the thickness of layers, films, and regions are exaggerated for clarity. Like reference numerals in the drawings denote like elements.

When an element such as a layer, film, region, or substrate is referred to as being "on" another element, it can be directly on the other element or intervening elements may also be present. In contrast, when an element is referred to as being "directly on" another element, there are no intervening elements present.

A liquid crystal display including a thin film transistor array panel according to an exemplary embodiment of the present invention will be described in detail with reference to FIGS. 1 and 2.

Figure 2:
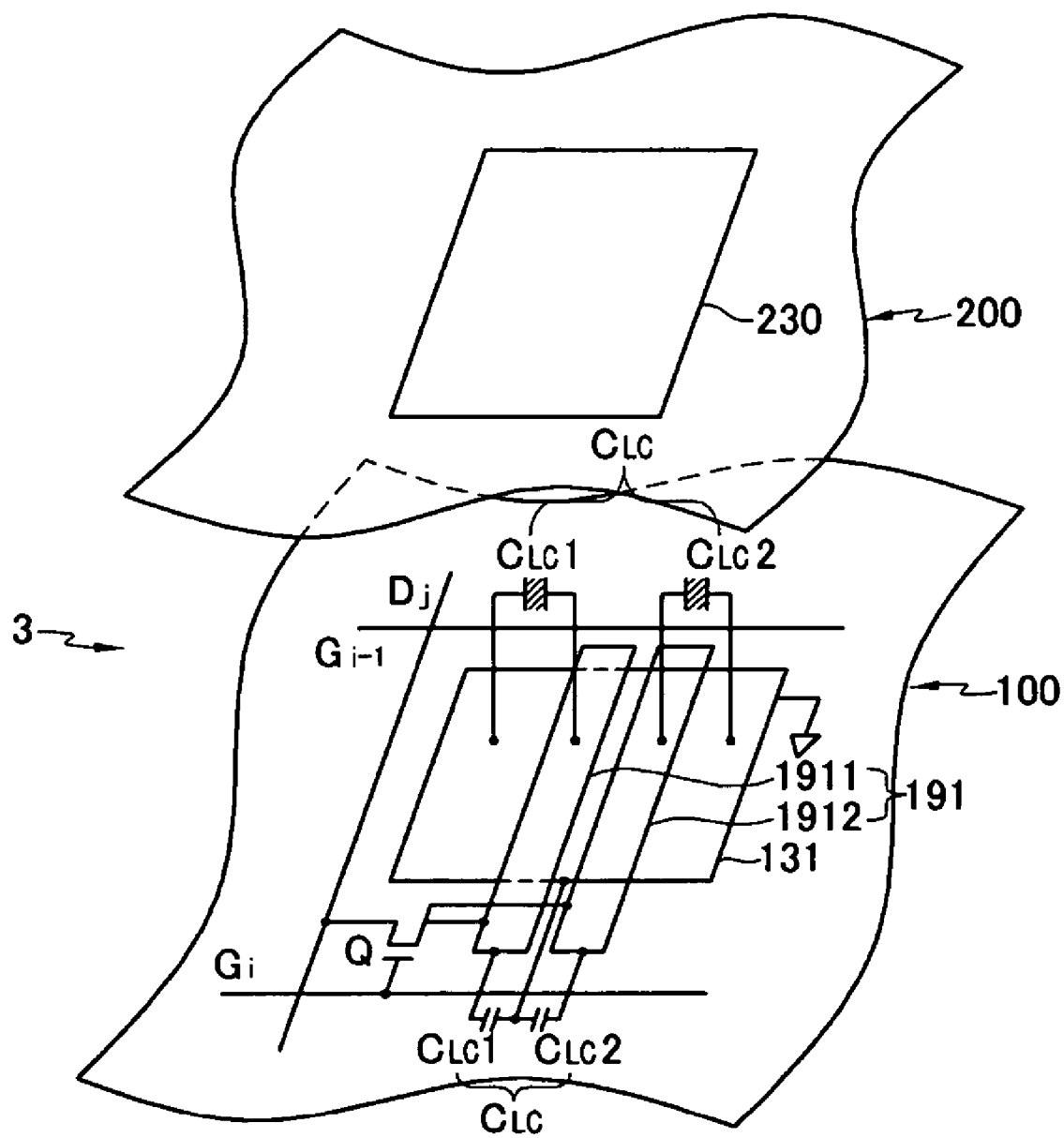
FIG. 2 is a circuit diagram of a pixel of an LCD according to an exemplary embodiment of the present invention.

FIG. 1 is a block diagram of an LCD according to an exemplary embodiment of the present invention, and FIG. 2 is a circuit diagram of a pixel of an LCD according to an exemplary embodiment of the present invention.

Referring to FIG. 1, an LCD according to an exemplary embodiment includes a liquid crystal (LC) panel assembly 300, a gate driver 400 and a data driver 500 that are coupled with the panel assembly 300, a gray voltage generator 800 coupled with the data driver 500, and a signal controller 600 for controlling the above elements.

The panel assembly 300 includes a plurality of signal lines $G_1$-$G_n$ and $D_1$-$D_m$, and a plurality of pixels connected to the signal lines $G_1$-$G_n$ and $D_1$-$D_m$ and arranged substantially in a matrix. In the structural view shown in FIG. 2, the panel assembly 300 includes lower and upper panels 100 and 200 facing each other, and an LC layer 3 interposed between the panels 100 and 200.

The signal lines include a plurality of gate lines $G_1$-$G_N$ for transmitting gate signals (also referred to as "scanning signals" hereinafter) and a plurality of data lines $D_1$-$D_m$ for transmitting data signals. The gate lines $G_1$-$G_n$ extend substantially in a row direction and are substantially parallel to each other, while the data lines $D_1$-$D_m$ extend substantially in a column direction and are substantially parallel to each other.

Referring to FIG. 2, each pixel, for example a pixel connected to the i-th gate line $G_i$ (i=1, 2, ..., n) and the j-th data line $D_j$ (j=1, 2, ..., m), includes a switching element Q connected to the signal lines $G_i$ and $D_j$, and an LC capacitor $C_{LC}$ and a storage capacitor $C_{ST}$ that are connected to the switching element Q. The storage capacitor $C_{ST}$ may be omitted.

The switching element Q is disposed on the lower panel 100 and has three terminals, i.e., a control terminal connected to the gate line $G_i$, an input terminal connected to the data line $D_j$, and an output terminal connected to the LC capacitor $C_{LC}$ and the storage capacitor $C_{ST}$.

The LC capacitor $C_{LC}$ includes a pixel electrode 191 and a common electrode 131, which are disposed on the lower panel 100 as two terminals. The LC layer 3 is disposed between the two electrodes 191 and 131, and functions as a dielectric of the LC capacitor $C_{LC}$. The pixel electrode 191 is connected to the switching element Q. The common electrode 131 is wholly formed on the lower panel 100 and is supplied with a common voltage Vcom.

The storage capacitor $C_{ST}$ is an auxiliary capacitor for the LC capacitor $C_{LC}$. The storage capacitor $C_{ST}$ includes the pixel electrode 191 and the common electrode 131, which is provided on the lower panel 100 and overlaps the pixel electrode 191 via an insulator.

The pixel electrode 191 includes a first pixel electrode 1911 and a second pixel electrode 1912, which are separated from each other. The storage capacitor $C_{ST}$ and the LC capacitor $C_{LC}$ respectively include first and second storage capacitors $C_{ST1}$ and $C_{ST2}$ connected in parallel and first and second LC capacitors $C_{LC1}$ and $C_{LC2}$ connected in parallel.

For a color display, each pixel uniquely represents one primary color (i.e., spatial division) or each pixel sequentially represents all the primary colors in turn (i.e., temporal division) such that a spatial or temporal sum of the primary colors is recognized as a desired color. An example of a set of the primary colors include red, green, and blue. FIG. 2 illustrates an example of the spatial division in which each pixel includes a color filter 230 representing one of the primary colors in an area of the upper panel 200 facing the pixel electrode 191. Alternatively, the color filter 230 is provided on or under the pixel electrode 191 on the lower panel 100.

One or more polarizers (not shown) are attached to the panel assembly 300.

Referring to FIG. 1 again, the gray voltage generator 800 generates two sets of pluralities of reference gray voltages related to the transmittance of the pixels. The reference gray voltages in one set have a positive polarity with respect to the common voltage Vcom, while those in the other set have a negative polarity with respect to the common voltage Vcom.

The gate driver 400 is connected to the gate lines $G_1$-$G_n$ of the panel assembly 300, and synthesize a gate-on voltage Von and a gate-off voltage Voff to generate the gate signals for application to the gate lines $G_1$-$G_n$.

The data driver 500 is connected to the data lines $D_1$-$D_m$ of the panel assembly 300 and applies data signals, which are selected from the gray voltages supplied by the gray voltage generator 800, to the data lines $D_1$-$D_m$. However, when the gray voltage generator 800 generates only some of the reference gray voltages as opposed to all the gray voltages, the data driver 500 may divide the reference gray voltages to generate all the gray voltages and select the data signals among the gray voltages.

The signal controller 600 controls the gate driver 400, the data driver 500, etc.

Each of the driving devices 400, 500, 600, and 800 may include at least one integrated circuit (IC) chip mounted on the LC panel assembly 300 or on a flexible printed circuit (FPC) film in a tape carrier package (TCP) type, which are attached to the panel assembly 300. At least one of the driving devices 400, 500, 600, and 800 may be integrated into the panel assembly 300 along with the signal lines $G_1$-$G_n$ and $D_1$-$D_m$ and the switching element Q. Alternatively, all the driving devices 400, 500, 600, and 800 may be integrated into a single IC chip.

The signal controller 600 is supplied with image signals R, G, and B, and input control signals for controlling the display thereof such as a vertical synchronization signal Vsync, a horizontal synchronization signal Hsync, a main clock signal MCLK, and a data enable signal DE, from an external graphics controller (not shown).

After generating gate control signals CONT1 and data control signals CONT2 and processing the image signals R, G, and B to ensure they are suitable for the operation of the panel assembly 300 on the basis of the input control signals, the signal controller 600 provides the gate control signals CONT1 to the gate driver 400, and the modified image data DAT and the data control signals CONT2 to the data driver 500.

The gate control signals CONT1 include a scanning start signal STV for instructing scanning to start, and at least one clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for notifying a start of data transmission for image data DAT for a group of pixels, a load signal LOAD for instructing application of the data voltages to the data lines $D_1$-$D_m$, and a data clock signal HCLK. The data control signals CONT2 may further include an inversion signal RVS for reversing the polarity of the data voltages (with respect to the common voltage Vcom).

The data driver 500 receives a packet of image data DAT for a pixel row from the signal controller 600, and converts the packet into analog data voltages. The data voltages are selected from the gray voltages supplied by the gray voltage generator 800 in response to the data control signals CONT2 from the signal controller 600.

In response to the gate control signals CONT1 from the signal controller 600, the gate driver 400 applies the gate-on voltage Von to the gate line G1-Gn. Because each of the gate lines G1-Gn is connected to a switching element Q of the corresponding pixel row, they turn on the switching element connected thereto. Accordingly, the data voltage applied to the data lines D1-Dm is supplied to the pixels of one row through the switching element Q.

The difference between the data voltage and the common voltage Vcom is represented as a voltage across the LC capacitor $C_{LC}$, which is referred to as a pixel voltage. The LC molecules in the LC capacitor $C_{LC}$ have orientations depending on the magnitude of the pixel voltage, and the molecular orientations determine the polarization of light passing through the LC layer 3. The polarizer(s) converts light polarization into light transmittance such that the pixel has a luminance represented by a gray of the image signal DAT.

The pixel electrode 191 is connected to the gate line 121 and the data line 171 through the switching element Q. The pixel electrode 191 is divided into the first and second pixel electrodes 1911 and 1912. Even if one of the first and second pixel electrodes 1911 and 1912 is shorted to the common electrode 131, the other is not shorted to the common electrode 131 and receives the data voltage through the switching element Q. Accordingly, the off-pixel defect which causes a pixel to display black may be prevented.

By repeating this procedure by a unit of a horizontal period (also referred to as "1H" and that is equal to one period of the horizontal synchronization signal Hsync, the data enable signal DE, and the gate clock CPV), all gate lines $G_1$-$G_n$ are sequentially supplied with the gate-on voltage Von, thereby applying the data signals to all pixels to display an image for a frame.

When a next frame starts after a previous frame finishes, the inversion control signal RVS applied to the data driver 500 is controlled such that the polarity of the data signals is reversed (which is referred to as "frame inversion"). The inversion control signal RVS may also be controlled such that the polarity of the data signals flowing in a data line are periodically reversed during one frame (for example, row inversion and dot inversion), or the polarity of the data signals in one packet are reversed (for example, column inversion and dot inversion).

The LCD panel assembly according to an embodiment of the present invention will be described in detail with reference to FIGS. 3 to 6.

Figure 3:
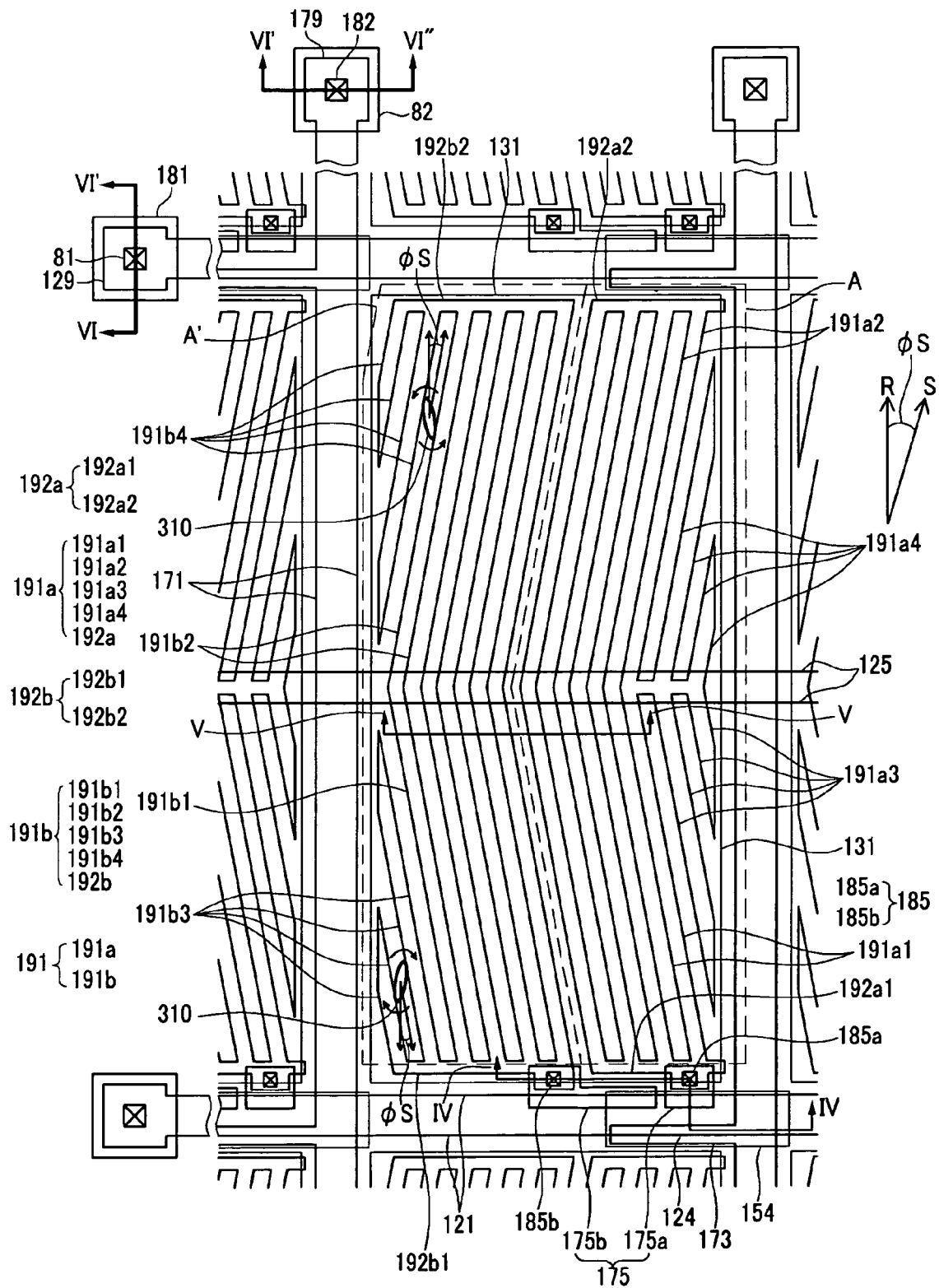
FIG. 3 is a layout view of a TFT array panel for an LCD according to an exemplary embodiment of the present invention.
Figure 4:
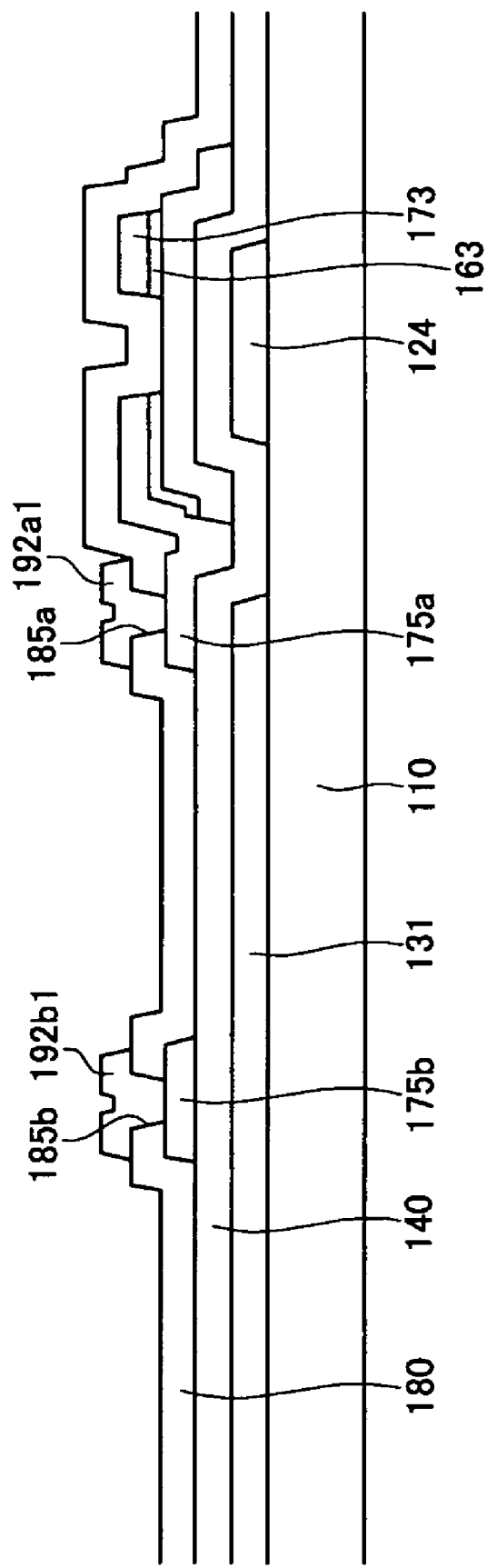
FIGS. 4, 5, and 6 are sectional views of the TFT array panel shown in FIG. 3 taken along the lines IV-IV, V-V, and VI-VI, respectively.
Figure 5:
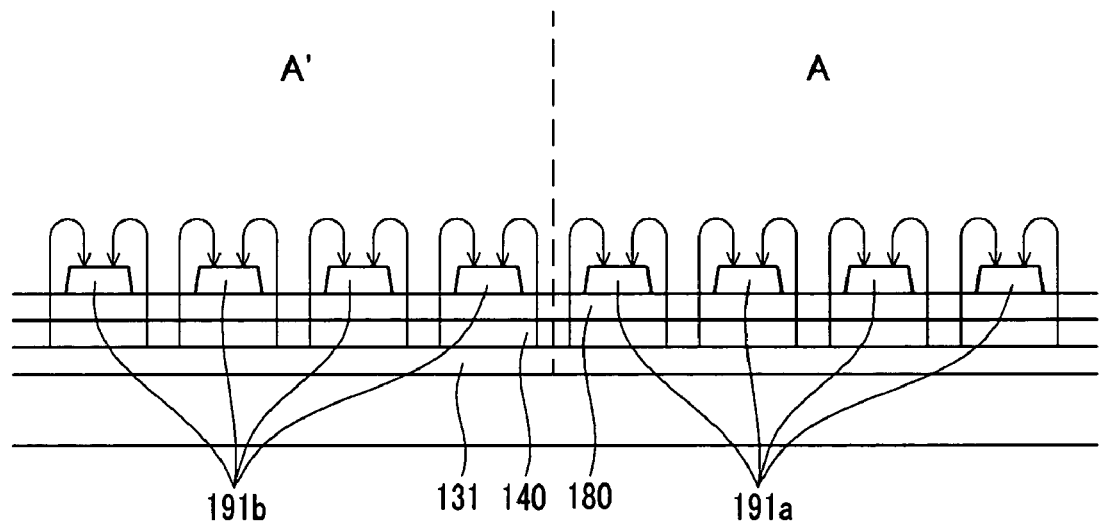
Figure 6:
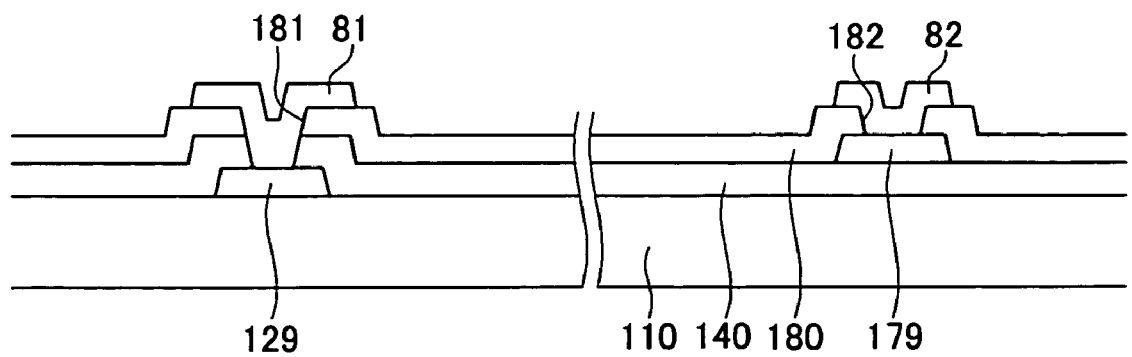

FIG. 3 is a layout view of a TFT array panel for an LCD according to an exemplary embodiment of the present invention, and FIGS. 4, 5, and 6 are sectional views of the TFT array panel shown in FIG. 3 taken along the lines IV-IV, V-V, and VI-VI, respectively.

A plurality of gate lines 121, a plurality of common electrode lines 125, and a plurality of common electrodes 131 are formed on an insulating substrate 110 made of a material such as transparent glass.

The gate lines 121 extend substantially in a transverse direction, are separated from each other, and transmit gate signals. Each gate line 121 includes a plurality of projections forming a plurality of gate electrodes 124, and an end portion 129 having a large area for contact with another layer or an external driving circuit. A gate driving circuit (not shown) for generating the gate signals may be mounted on a flexible printed circuit (FPC) film (not shown), which may be attached to the substrate 110, directly mounted on the substrate 110, or integrated with the substrate 110. The gate lines 121 may be extended to connect to a driving circuit that may be integrated with the substrate 110.

Each common electrode line 125 extends substantially in the transverse direction and is supplied with a common voltage. The common electrode line 125 is disposed at a center portion between two adjacent gate lines 121, and is made of the same layer as the gate lines 121. The common electrode lines may include at least one expansion to block the leakage of light.

The common electrodes 131 are connected to the common electrode line 125 and receive the common voltage. The common electrodes 131 have a tetragonal shape and are disposed in a matrix arrangement between the gate lines 121. The common electrodes 131 may include a transparent material such as ITO (indium tin oxide) or IZO (indium zinc oxide) The common electrode lines 125 may be made of the same layer as the common electrodes 131.

The gate lines 121 and the common electrode lines 125 may be made of a metal or a metal alloy of Al, Ag, Cu, Mo, Cr, Ti, or Ta. . The gate lines 121 may have a multi-layered structure including two layers having different physical characteristics. One of the two layers may be made of a low resistance metal or metal alloy such as Al, Ag, or Cu for reducing signal delay or voltage drop in the gate lines 121. The other layer may be made of a material containing a metal or metal alloy of Mo, Cr, Ta, or Ti, which has favorable physical, chemical, and electrical contact characteristics with other materials such as indium tin oxide (ITO) or indium zinc oxide (IZO). Examples include a lower Cr layer and an upper Al—Nd alloy layer, and a lower Al layer and an upper Mo layer. However, the gate lines 121 may be made of various other metals or conductive materials.

In addition, the lateral sides of the gate lines 121 and the common electrode lines 125 are inclined at an angle relative to a surface of the substrate, and the inclination angle thereof ranges between about 30 and 80 degrees.

A gate insulating layer 140 preferably made of silicon nitride ($SiN_x$) is formed on the gate lines 121, the common electrode lines 125, and the common electrodes 131. The gate insulating layer 140 prevents the gate lines 121 and the common electrodes 131 from shorting with each other, or to other layers applied later.

In an exemplary embodiment of the invention, a plurality of semiconductors 154 made of hydrogenated amorphous silicon (abbreviated to "a-Si") or polysilicon are formed on the gate insulating layer 140. Each of the plurality of semiconductors 154 is disposed on the gate electrodes 124 and may have a plurality of extensions extended out toward the gate lines 121.

A plurality of ohmic contact islands 163 and 165 that are preferably made of silicide or n+ hydrogenated a-Si heavily doped with an N-type impurity such as phosphorous are formed on the semiconductors 154. The ohmic contact islands 163 and 165 are located in pairs on the semiconductors 154.

The lateral sides of the semiconductors 154 and the ohmic contact islands 163 and 165 are inclined at an angle relative to a surface of the substrate, and the inclination angles thereof are in a range between about 30 and 80 degrees.

A plurality of data lines 171 and a plurality of drain electrodes 175 separated from the data lines 171 are formed on the ohmic contact islands 163 and 165 and the gate insulating layer 140.

The data lines 171 for transmitting data voltages extend substantially in a longitudinal direction and cross the gate lines 121 at right angles. The data lines 171 also intersect the common electrode lines 125 such that each data line 171 is disposed between the common electrodes 131. Each data line 171 includes an end portion 179 having a large area for contact with another layer or an external device. Each data line 171 includes a plurality of source electrodes 173 projecting toward the drain electrodes 175. A data driving circuit (not shown) for generating the data signals may be mounted on an FPC film (not shown), which may be attached to the substrate 110, directly mounted on the substrate 110, or integrated with the substrate 110. The data lines 171 may be extended to connect to a driving circuit that may be integrated with the substrate 110.

The drain electrodes 175 are separated from the data lines 171 and disposed opposite the source electrodes 173 with respect to the gate electrodes 124. Each drain electrode 175 includes first and second drain electrodes 175a and 175b that are separated from each other.

A gate electrode 124, a source electrode 173, and a drain electrode 175 along with a semiconductor 154 form a TFT having a channel formed in the semiconductors 154 disposed between the source electrode 173 and the drain electrode 175.

The data lines 171 and the drain electrodes 175 may be made of a refractory metal such as Cr, Mo, Ti, Ta, or alloys thereof. However, the data lines 171 and the drain electrodes may also have a multilayered structure including a low-resistive layer (not shown) and a contact layer (not shown). An example is a lower Mo (Mo alloy) layer, an intermediate Al (Al alloy) layer, and an upper Mo (Mo alloy) layer. However, the data lines 171 and the drain electrodes 175 may be made of various other metals or conductive materials.

The ohmic contacts 163 and 165 are interposed between the underlying semiconductors 154 and the overlying data lines 171 and the overlying drain electrodes 175 thereon, and reduce the contact resistance therebetween. The extensions of the semiconductors 154 are used to smooth the profile of the surface, thereby preventing disconnection of the data lines 171. The semiconductors 154 include some exposed portions that are not covered by the data lines 171 and the drain electrodes 175, where such portions are located between the source electrodes 173 and the drain electrodes 175.

The data lines 171 and the drain electrodes 175 have tapered lateral sides, and the inclination angles thereof range between about 30 and 80 degrees.

A passivation layer 180 is formed on the data lines 171, the drain electrodes 175, and the exposed portions of the semiconductors 154. The passivation layer 180 may be made of an inorganic insulator containing silicon nitride or silicon oxide, a photosensitive organic material having a favorable flatness characteristic, or a low dielectric insulating material having a dielectric constant lower than 4.0 such as a-Si:C:O and a-Si:O:F formed by plasma enhanced chemical vapor deposition (PECVD). The passivation layer 180 may include a lower film of an inorganic insulator and an upper film of an organic insulator such that it takes the insulating characteristics of the organic insulator while preventing the exposed portions of the semiconductors 154 from being damaged by the organic insulator.

The passivation layer 180 has a plurality of contact holes 182 and 185 exposing the end portions 179 of the data lines 171 and the first and second drain electrodes 175a and 175b, respectively. The passivation layer 180 and the gate insulating layer 140 have a plurality of contact holes 181 exposing the end portions 129 of the gate lines 121.

A plurality of pixel electrodes 191, a plurality of contact assistants 81 and 82, and a plurality of overpasses 83, which are preferably made of a transparent conductor such as ITO or IZO, are formed on the passivation layer 180.

The pixel electrodes 191 extend substantially in the longitudinal direction and overlap the common electrodes 131. The pixel electrodes 191 include a first sub-pixel electrode 191a and a second sub-pixel electrode 191b, which are separated from each other.

The first sub-pixel electrode 191a and the second sub-pixel electrode 191b are respectively disposed in the left and the right sides of the region enclosed by the gate lines 121 and the data lines 171.

The first sub-pixel electrode 191a includes a plurality of upper and lower branch electrodes 191a1 and 191a2 that are parallel to each other and curved at the center portions with a predetermined angle, and a plurality of upper and lower connections 192a1 and 192a2 for respectively connecting to upper and lower branch electrodes 191a1 and 191a2. Each of the upper and lower branch electrodes 191a1 and 191a2 of the pixel electrodes 191 substantially has inversion symmetry with respect to a center line of the common electrodes 131 parallel to the gate lines 121, and the upper and lower connections 192a1 and 192a2 are disposed closely to the neighboring gate lines 121. In addition, the first sub-pixel electrode 191a includes a plurality of right branch electrodes 191a3 and 191a4 that are parallel to the upper and lower branch electrodes 191a1 and 191a2 and connected to the right external of the upper and lower branch electrodes 191a1 and 191a2. The right branch electrodes 191a3 and 191a4 are shorter than the upper and lower branch electrodes 191a1 and 191a2 and are connected to the upper and lower branch electrodes 191a1 and 191a2 through a connection overlapping the common electrode lines 125.

The second sub-pixel electrode 191b include a plurality of upper and lower branch electrodes 191b1 and 191b2 that are parallel to each other and are curved at the center portions with a predetermined angle, and a plurality of upper and lower connections 192b1 and 192b2 for respectively connecting to upper and lower branch electrodes 191a1 and 191a2. Each of the upper and lower branch electrodes 191b1 and 191b2 of the second sub-pixel electrodes 191b substantially have inversion symmetry with respect to a center line of the common electrodes 131 that are parallel to the gate lines 121, and the upper and lower connections 192b1 and 192b2 are disposed closely to the neighboring gate lines 121. In addition, the second sub-pixel electrodes 191b include a plurality of left branch electrodes 191b3 and 191b4 that are parallel to the upper and lower branch electrodes 191b1 and 191b2 and connected to the left external of the upper and lower branch electrodes 191b1 and 191b2. The left branch electrodes 191b3 and 191b4 are shorter than the upper and lower branch electrodes 191b1 and 191b2, and are connected to the upper and lower branch electrodes 191b1 and 191b2 through the upper and lower connections 192b1 and 192b2.

The branch electrodes 191a1, 191a2, 191b, and 191b2 of the pixel electrodes 191 are curved at the center portions parallel to the gate lines 121 with a predetermined angle ØS with respect to the data lines 171. Each of the upper branches 191a2 and 191b2 obliquely extend approximately from a lower left portion of the pixel electrode 191 to approximately an upper right portion of the pixel electrodes 191, and each of the lower branches 191a1 and 191b 1 obliquely extend approximately from a upper left portion of the pixel electrode 191 to approximately a lower right portion of the pixel electrode 191.

The vertical direction is indicated by "R" and the extended direction of the upper branch electrodes 191a2 and 191b2 is indicated by "S".

The first and second sub-pixel electrodes 191a and 191b are respectively physically and electrically connected to the first and second drain electrodes 175a and 175b through the contact holes 185a and 185b such that the first and second pixel electrodes 191a and 191b receive the data voltages from the first and second drain electrodes 175a and 175b.

Because the pixel electrodes 191 are subdivided into the first and second sub-pixel electrodes 191a and 191b that respectively receive the data voltages from the drain electrodes 175a and 175b, even though the first and second sub-pixel electrodes 191a and 191b are connected to the switching element Q, the first and second sub-pixel electrodes 191a and 191b are electrically disconnected from each other. Accordingly, two regions A and A' in which the first and second sub-pixel electrodes 191a and 191b are respectively disposed receive the same data voltage, but are independently driven. Therefore, even if one of the first and second sub-pixel electrodes 191a and 191b is shorted to the common electrode 131, the other is not shorted to the common electrode 131 and receives the data voltage through the switching element Q. Accordingly, the pixel in which the short is generated displays the image and the off-pixel defect which causes a black pixel may be prevented.

The pixel electrodes 191 are supplied with the data voltages to generate electrical fields in cooperation with the common electrodes 131. The common electrodes 131 determine the orientations of liquid crystal molecules in the liquid crystal layer to adjust polarization of incident light.

A pixel electrode 191 and the common electrode 131 form a liquid crystal capacitor $C_{LC}$, which stores applied voltages after turn-off of the TFT. An additional capacitor called a "storage capacitor" $C_{ST}$ that is connected in parallel to the liquid crystal capacitor is provided for enhancing the voltage storing capacity. The storage capacitors $C_{ST}$ are implemented by overlapping the pixel electrodes 191 with the common electrodes 131 via the gate insulating layer 140 and the passivation layer 180.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and aid in the adhesion of the end portions 129 and 179 and external devices.

Figure 7:
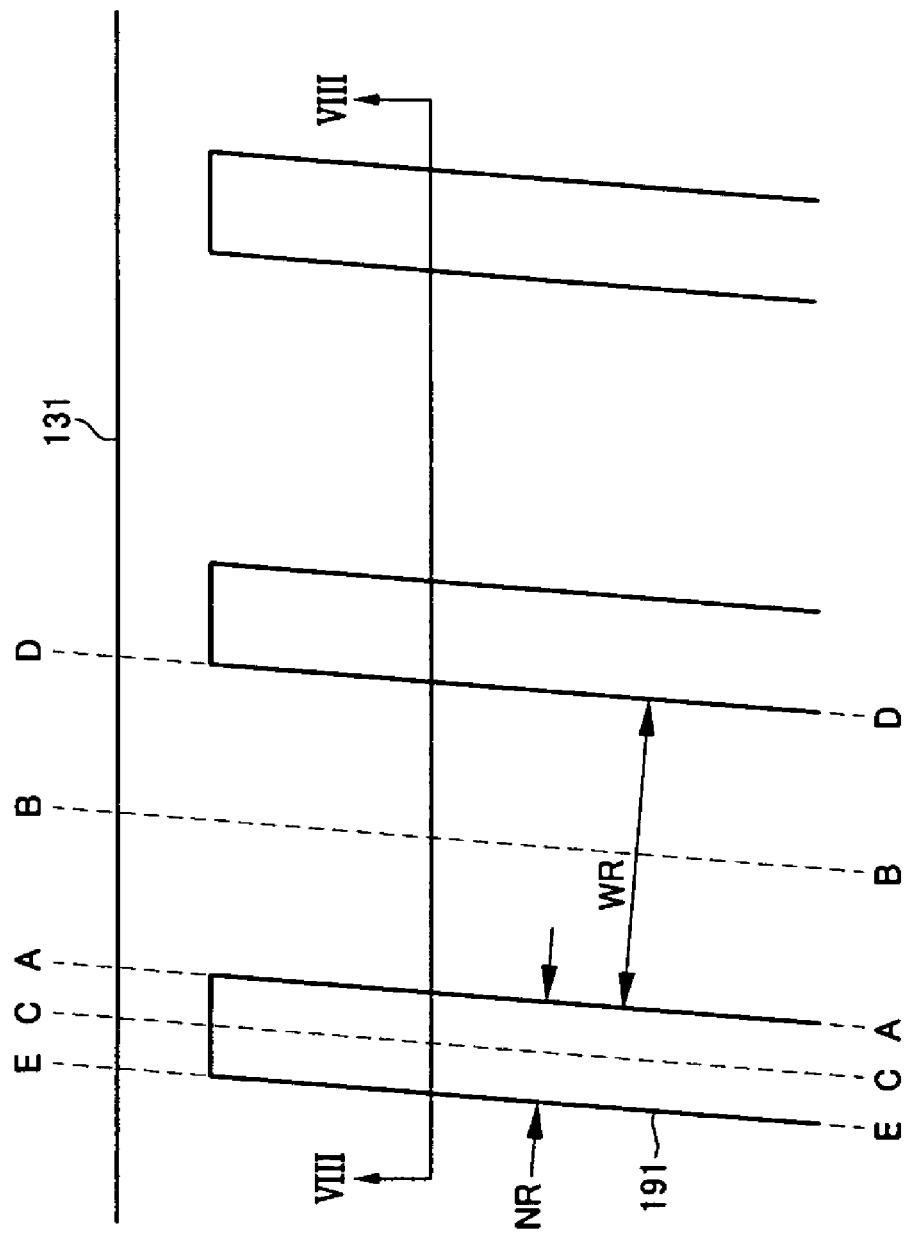
FIG. 7 is a layout view of electrodes of the TFT array panel for the liquid crystal display (LCD) according to another exemplary embodiment of the present invention.
Figure 8:
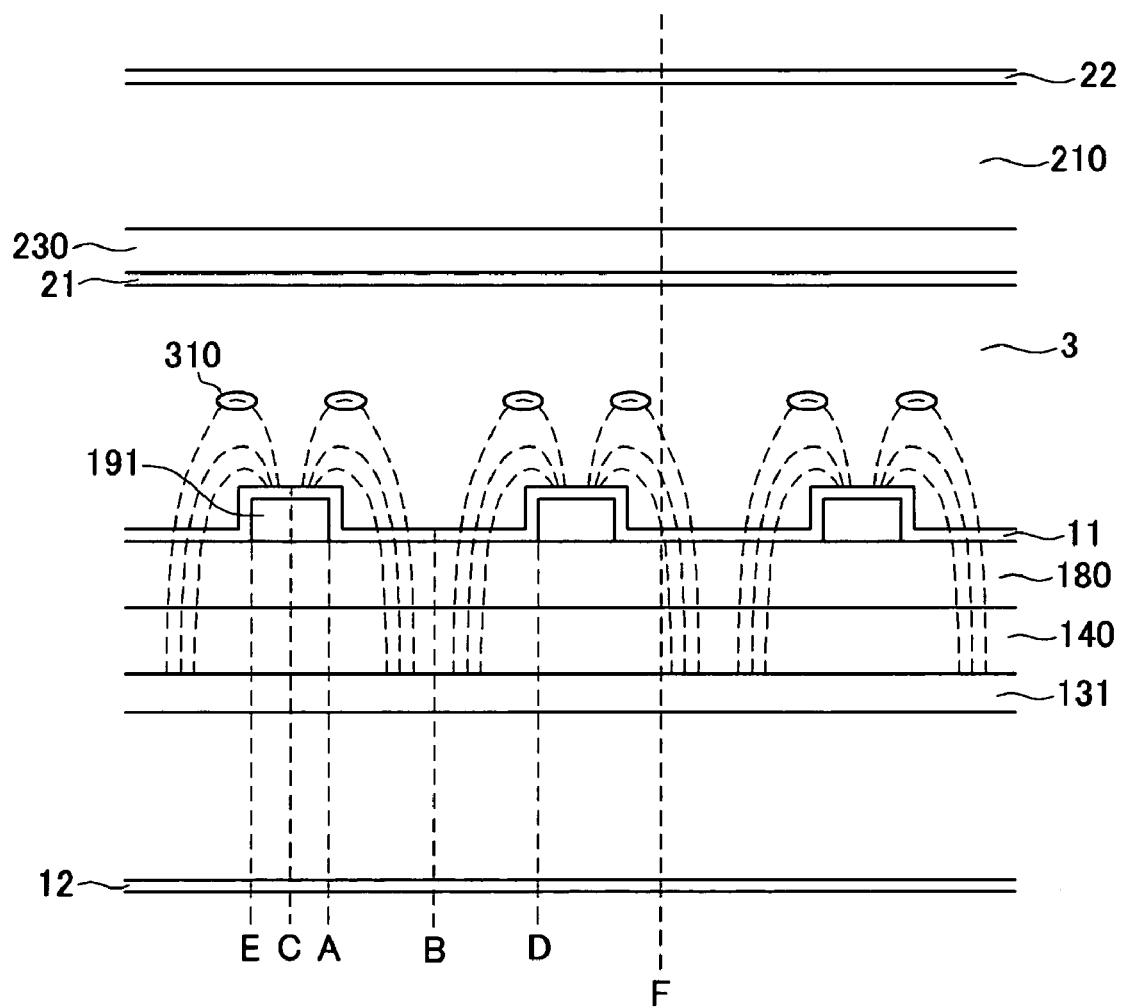
FIG. 8 is a cross-sectional view taken along line VIII-VIII in FIG. 7, which shows both upper and lower panels as well as lines of electric force between the two panels.

FIG. 7 is a layout view of electrodes of an LCD according to the exemplary embodiment of the present invention, and FIG. 8 is a cross-sectional view taken along the line VIII-VIII in FIG. 7, which illustrates both upper and lower panels as well as lines of electric force between the panels.

A common electrode 131 made of a transparent planar conductive material is formed on the inner surface of a lower substrate 110 made of a transparent insulating material such as glass or quartz. The common electrode 131 is covered with a gate insulating layer 140 and a passivation layer 180, and a plurality of narrow linear (pixel) electrodes 191 (branch electrodes). The pixel electrodes 191 are parallel to each other, elongated in a vertical direction, and are formed on the passivation layer 180. The pixel electrodes 191 may be transparent or opaque. The width of the pixel electrodes 191 is equal to or less than the distance between adjacent boundary lines of the two adjacent pixel electrodes 191. An aligning layer 11 made of polyimide is coated over the entire surface. The aligning layer 11 may be rubbed or not, and may be homogeneous. A polarizing plate or an analyzer 12 is attached to the outer surface of the lower substrate 110.

A color filter 230 is formed on the inner surface of an upper substrate 210, which is opposite the lower substrate 110 and is also made of a transparent insulating material, and an aligning layer 21 with a polyimide coating. The aligning film 21 may be homogeneous. A polarizing plate or an analyzer 22 is attached to the outer surface of the upper substrate 210.

A liquid crystal layer 3 having a positive optical anisotropy is interposed between the aligning films 11 and 21 on the substrates 110 and 210. Accordingly, liquid crystal molecules of the liquid crystal layer 3 are aligned nearly parallel to the direction of the pixel electrodes 191 according to the rubbing direction of the aligning film 11 under no electrical field with the angle ØS (referring to FIG. 3). When applying an electrical field, the liquid crystal molecules of the liquid crystal layer 3 are aligned nearly perpendicular to the direction of the pixel electrodes 191 according to the electrical field to adjust polarization of incident light.

The light source for the liquid crystal display may be either a backlight unit (not shown) located under the lower substrate 110 or external natural light that may enter the LCD through the upper substrate 210. In the case of a reflective type of LCD using natural light, a polarizing plate 12 attached to the lower substrate 110 may not be required, and the pixel electrodes 191 and the common electrodes 131 may be made of an opaque material having a high reflectance such as aluminum. In addition, the lower substrate 110 may be opaque.

When voltages are applied to the electrodes 191 and 131, the electrical field shown in FIG. 8 is generated due to the potential difference between the electrodes 191 and 270. In FIG. 8, dotted lines indicate the electrical lines of force.

As shown in FIG. 8, the shape of the electrical field is symmetrical with respect to a vertical central line C (the line C corresponds to a plane) of a narrow region NR on the pixel electrodes 191 and a vertical central line B (the line B also corresponds to a plane) of a wide region WR between the pixel electrodes 191. The lines of electrical field have a semi-elliptical or parabolic shape (hereinafter, the shape of the electrical lines of force is referred as parabolic for simplicity) and is generated in a region between the central line C of the narrow region NR and the central line B of the wide region WR. The vertices of the electrical lines of force are in a boundary line A (the line A corresponds to a surface) between the narrow region NR and the wide region WR.

Lines tangent to the electrical lines of force on the boundary line A between the narrow region NR and the wide region WR are substantially parallel to the substrate 110, and those at central points of the narrow region NR and the wide region WR are substantially perpendicular to the substrates 110 and 210. In addition, the center of the parabolas and the vertical vertex of the parabolas are positioned on the boundary line A between the narrow region NR and the wide region WR, and two horizontal vertices are positioned in the wide region WR and the narrow region NR, respectively. The parabolas are asymmetrical with respect to the boundary line A since the horizontal vertex positioned in the narrow region NR is closer to the center of the parabola than the horizontal vertex positioned in the wide region WR. In addition, the density of the electrical lines of force varies based on position, and thus the field strength also varies in proportion to the density of the electrical lines of force. Accordingly, the field strength is the largest on the boundary line A-A of FIG. 22 between the narrow region NR and the wide region WR. The field strength decreases toward the central lines C-C and B-B of the broad and the narrow regions BR and NR and towards the upper substrate 210.

The two aligning films 11 and 21 are rubbed or exposed to ultraviolet light, and the liquid crystal molecules are aligned in one horizontal direction. The liquid crystal molecules may have some pre-tilt angle with respect to the substrates 110 and 210, but are aligned substantially parallel to the substrates 110 and 210. When viewed on a plane parallel to the substrates 110 and 210, the liquid crystal molecules are arranged to have a predetermined angle with respect to the directions parallel and perpendicular to the pixel electrodes 191. The polarizing directions of the polarizing plates 12 and 22 are perpendicular to each other, and the polarizing direction of the polarizer 12 almost coincides with the rubbing direction. The liquid crystal material inserted between the two aligning films 11 and 21 is a nematic liquid crystal material having positive dielectric anisotropy.

When a voltage applied to the pixel electrodes 191 is higher than that applied to the common electrode 131, the liquid crystal molecules 310 are re-arranged such that the forces due to the electrical field are balanced with each other. The forces depend on the direction and strength of the electrical field and an elastic restoring force due to the aligning treatment.

Referring to FIGS. 3-4, a direction perpendicular to the substrates is a z direction, a direction perpendicular to the substrates and to the direction of the pixel electrodes 191 is an x direction, and a direction parallel to the direction of the pixel electrodes 191 is a y direction. The direction from left to right in FIG. 3 is the positive x direction, the direction upward along the pixel electrodes 191 in FIG. 3 is the positive y direction, and the direction from the lower substrate 110 to the upper substrate 210 in FIG. 4 is the positive z direction.

The variation of twist angle, which is defined by the angle made by the projection of the vertical axis of a liquid crystal molecule 310 with the x-axis or the initially aligned direction on the x-y plane parallel to the substrate 10, is described with reference to FIGS. 9 to 11.

Figure 9:
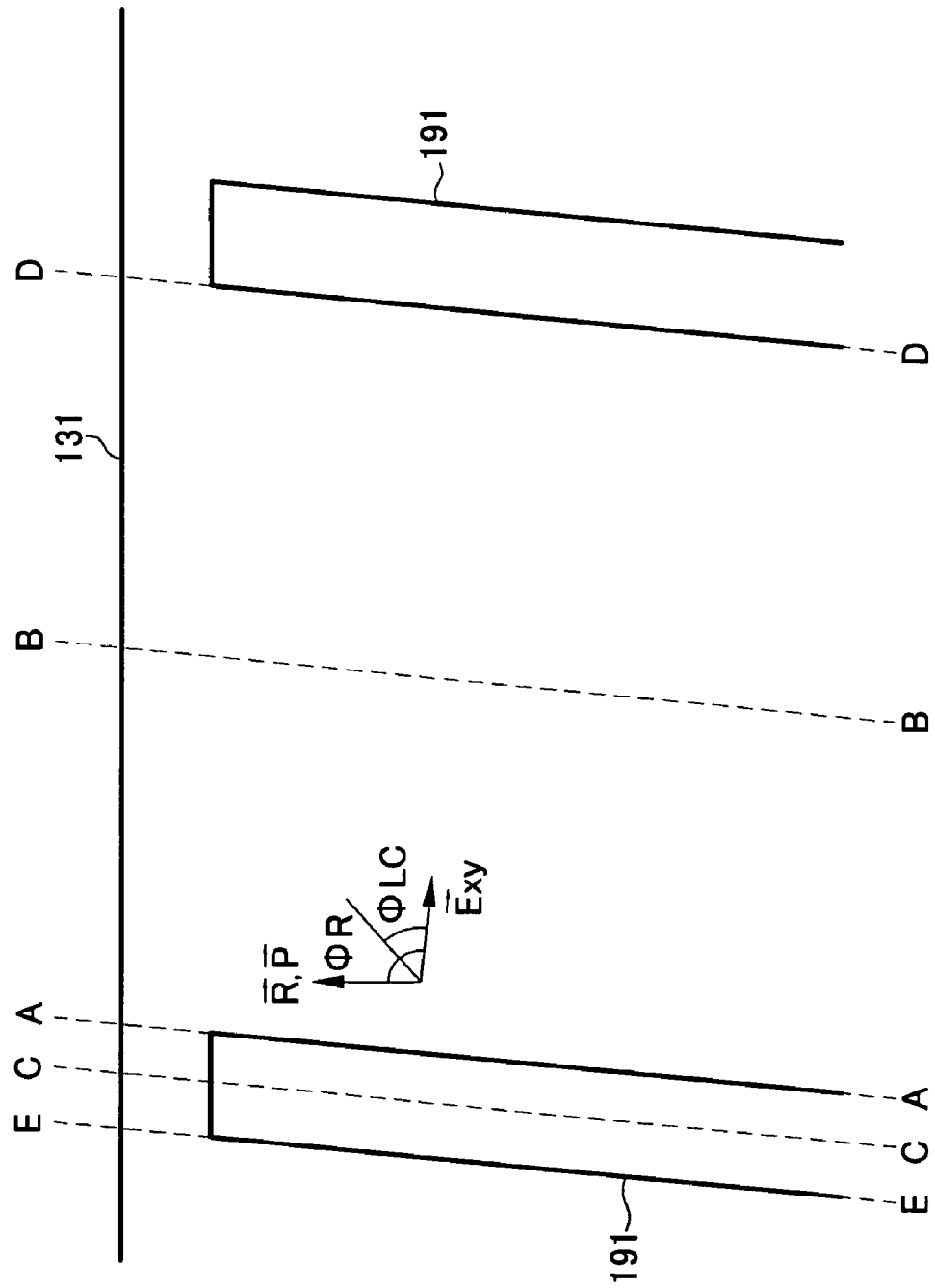
FIG. 9 is a layout view of electrodes illustrating the twist angle of liquid crystal molecules in another exemplary embodiment of the present invention.

FIG. 9 is a layout view of electrodes illustrating the twist angle of liquid crystal molecules in an exemplary embodiment of the present invention. FIG. 10 is a graph illustrating the variation of the twist angle of the liquid crystal molecules as a function of the horizontal position according to an exemplary embodiment of the present invention. FIG. 11 is a graph illustrating the variation of the twist angle of the liquid crystal molecules as a function of height according to an exemplary embodiment of the present invention.

As shown in FIG. 9, the rubbing direction is indicated by $\vec{R}$, an x-y plane component of the electrical field is indicated by $\vec{E}_{xy}$, and the polarizing direction or the optical axis of the polarizing plate 12 is indicated by $\vec{P}$. The angle made by the rubbing direction $\vec{R}$ with the x-axis is represented by ØR, and the angle made by the vertical axis of the liquid crystal molecule with the x-axis is represented by ØLC. The angle ØP made by the optical axis of the polarizing plate 12 with the x-axis is equal to ØR since the optical axis of the polarizing plate 12 is parallel to the rubbing direction $\vec{R}$. The x-y plane component $\vec{E}_{xy}$ of the electrical field is in the positive x direction from the boundary line A to the central line B of the wide region WR, and in the negative x direction from the central line B of the wide region WR to the next boundary line D.

The strength of the electrical field component $\vec{E}_{xy}$ is largest on the boundary lines A and D, and becomes smaller toward the central line B-B where the strength of the electrical field component $\vec{E}_{xy}$ is zero.

The magnitude of the elastic restoring force generated by the rubbing process is substantially constant on the x-y plane regardless of position.

Figure 10:
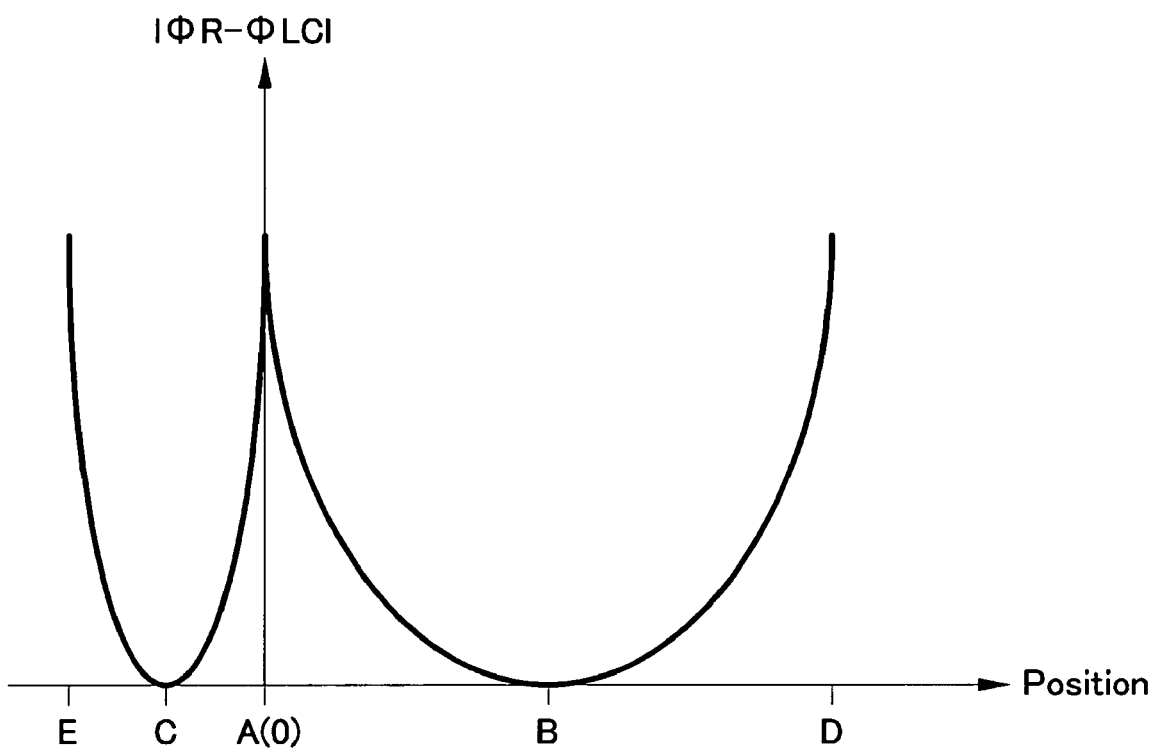
FIG. 10 is a graph illustrating the variation of the twist angle of the liquid crystal molecules as a function of the horizontal position according to another exemplary embodiment of the present invention.

As illustrated in FIG. 10, the vertical axis of the liquid crystal molecule or the molecular axis on the boundary lines A and D is substantially parallel to the electrical field component $\vec{E}_{xy}$, and makes a large angle with respect to the rubbing direction $\vec{R}$ since the liquid crystal molecules may be arranged to balance the two forces. However, the closer the central lines C and B of the regions NR and WR are, the smaller the angle |ØR-ØLC | that the molecular axis makes with the rubbing direction $\vec{R}$, The molecular axis on the central lines B and C is in the rubbing direction $\vec{R}$. The angle made by the optical axis of the polarizing plate 12 with the molecular axis has the same distribution as above since the optical axis of the polarizing plate 12 is parallel to the rubbing direction $\vec{R}$, and this angle is closely related to the transmittance of the incident light.

Various shapes of electrical fields may be generated by varying the ratio of the widths of the narrow region NR and the wide region WR. Although the narrow region NR on the pixel electrodes 191 cannot be used as the display region when the pixel electrodes 191 are opaque, it may be used as the display region when the pixel electrodes 191 are transparent.

The x-y plane component of the electrical field $\vec{E}_{xy}$ becomes smaller along the z-axis from the lower aligning film 11 to the upper aligning film 21. The elastic restoring force generated by the aligning treatment is greatest on the surfaces of the aligning films 11 and 21, and is reduced toward the center of the liquid crystal layer between the aligning films 11 and 21.

Figure 11:
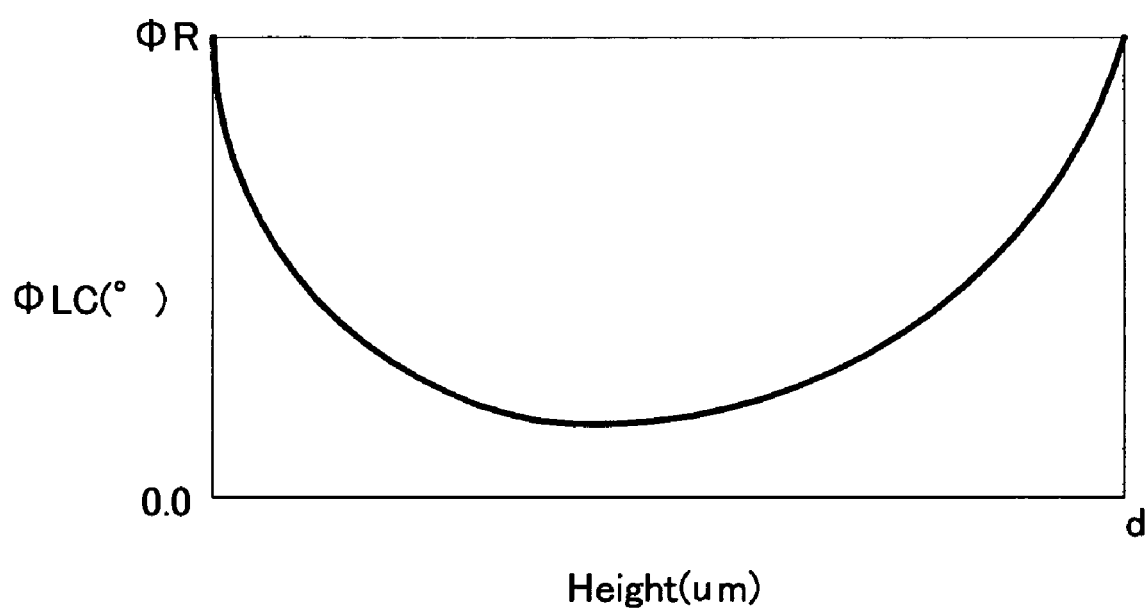
FIG. 11 is a graph illustrating the variation of the twist angle of the liquid crystal molecules as a function of height according to another exemplary embodiment of the present invention.

FIG. 11 illustrates the twist angle made by the molecular axis with the x-axis from the lower aligning film 11 to the upper aligning film 21 along the z-axis. In FIG. 11, the horizontal axis indicates the height from the lower aligning film 11, and the vertical axis represents the twist angle, where d is the cell gap between the two aligning films 11 and 21.

As illustrated in FIG. 11, the twist angle on the surfaces of the aligning films 11 and 21 is large since the aligning force of the aligning films 11 and 21 is great. The twist angle becomes small toward the center of the liquid crystal layer, and the molecular axis at the center of the liquid crystal layer is substantially in the direction of the electrical field component $\vec{E}_{xy}$. The molecular axis on the aligning films 11 and 21 is arranged in the rubbing direction $\vec{R}$.

The difference of the twist angle between the adjacent liquid crystal molecules is known in the art as twist. The twist corresponds to the slope of the curve in FIG. 24. The twist is large near the surfaces of the aligning films 11 and 21, and decreases toward the center of the liquid crystal layer.

Figure 12:
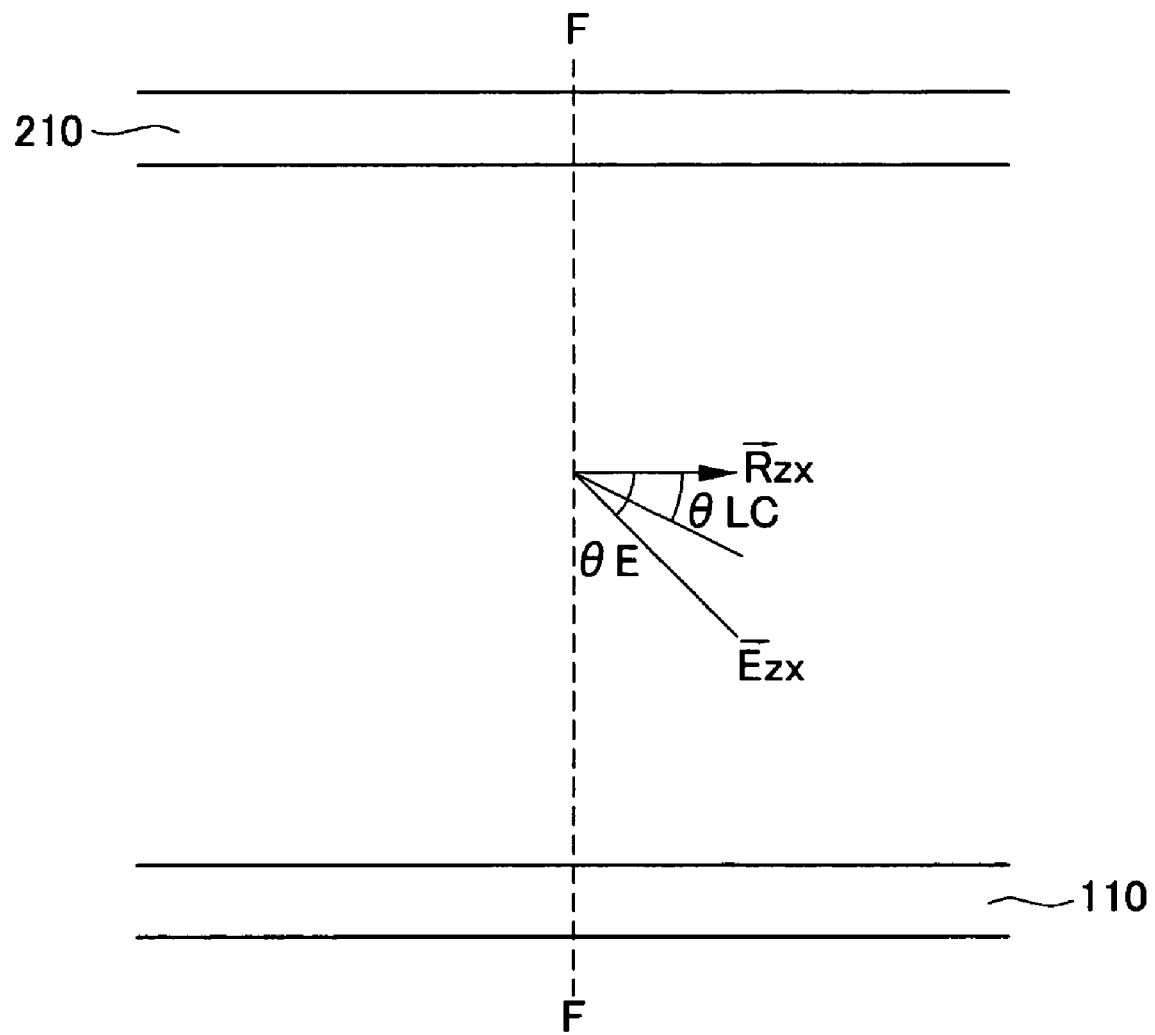
FIG. 12 illustrates the variation of the tilt angle of the liquid crystal molecules according to an exemplary embodiment of the present invention.
Figure 14:
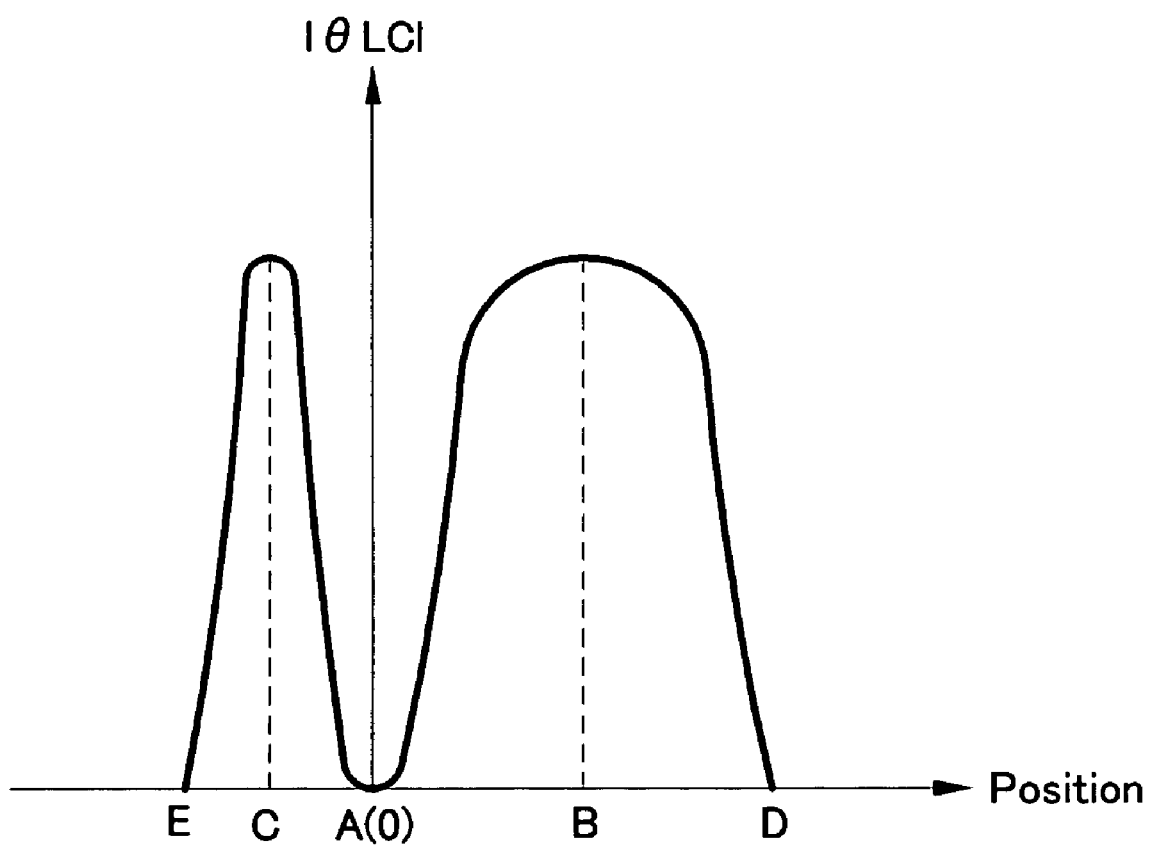
FIG. 14 is a graph illustrating the variation of the tilt angle of the liquid crystal molecules as a function of horizontal position according to an exemplary embodiment of the present invention.

FIGS. 12 and 14 illustrate the variation of the tilt angle that the molecular axis makes with the x-axis or the initially aligned direction on a plane perpendicular to the substrate, for example, a z-x plane.

Figure 13:
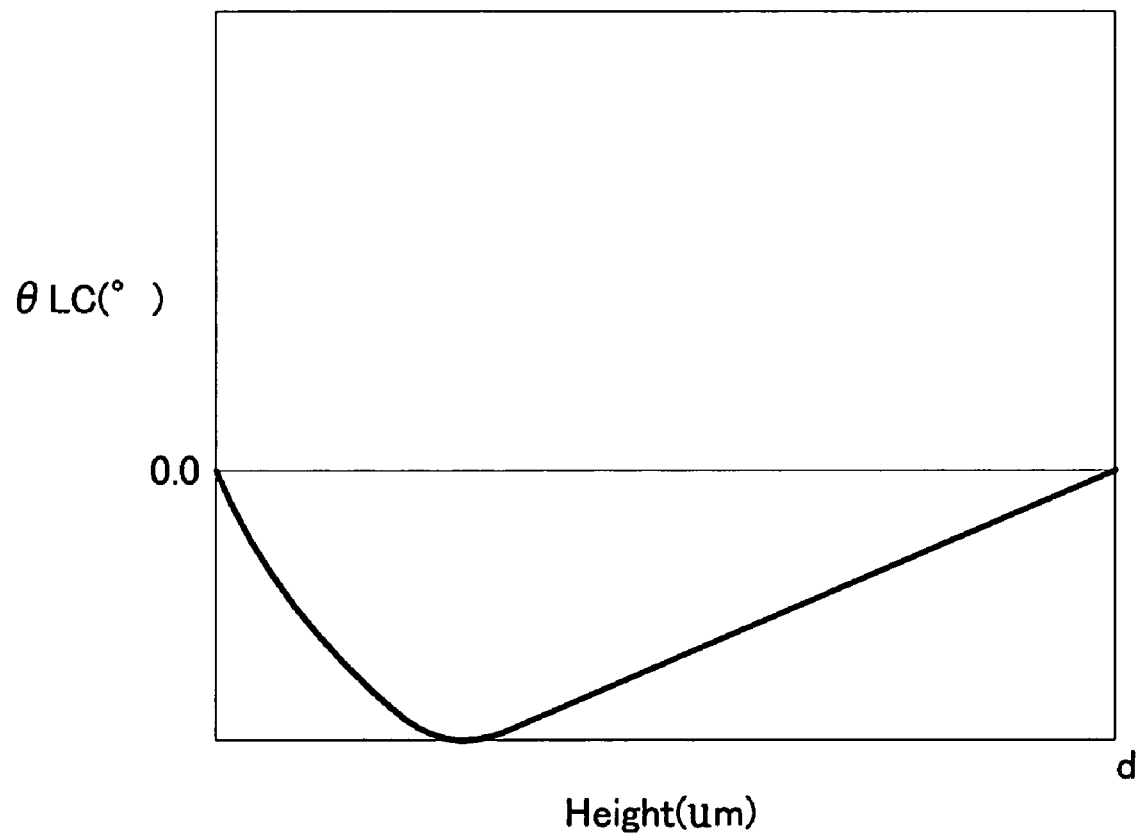
FIG. 13 is a graph illustrating the variation of the tilt angle of the liquid crystal molecules as a function of height according to an exemplary embodiment of the present invention.

FIG. 12 illustrates the tilt angle of the liquid crystal molecules according to an exemplary embodiment of the present invention. FIG. 13 is a graph illustrating the variation of the tilt angle of the liquid crystal molecules as a function of height according to an exemplary embodiment of the present invention. FIG. 14 is a graph illustrating the variation of the tilt angle of the liquid crystal molecules as a function of horizontal position according to an exemplary embodiment of the present invention.

FIG. 12 illustrates only the substrates 110 and 210 for the purpose of simplifying explanation. In FIG. 12, the z-x plane component of the $\vec{R}$ indicating the rubbing direction in FIG. 9 is represented by $\vec{R}_{zx}$ and the z-x plane component of the electrical field is represented by $\vec{E}_{zx}$. The angle made by the field component $\vec{E}_{zx}$ with the x-axis is indicated by θE and the tilt angle made by the molecular axis with the x-axis is indicated by θLC. $\vec{R}_{zx}$ is in the x direction since the vector $\vec{R}$ exists on the x-y plane assuming a pre-tilt angle is ignored.

The magnitude of the field component $\vec{E}_{zx}$ and the angle θE become smaller as one moves from the lower substrate 110 towards the upper substrate 210.

An elastic restoring force caused by the aligning treatment is larger on the surfaces of the two substrates 110 and 210, and becomes smaller toward the center of the liquid crystal layer.

The liquid crystal molecules may be arranged to balance the two forces. As illustrated in FIG. 13, the molecular axis on the surfaces of the substrates 110 and 210 is arranged substantially parallel to the x-axis since the aligning force is strongest there. Since the force due to the electrical field becomes relatively stronger compared with the aligning force from the substrates 110 and 210, the magnitude of the tilt angle $θ_{LC}$ increases continuously. The vertex of the curve is formed at a point near the lower substrate 110.

The angle θE that the field component $\vec{E}_{zx}$ makes with the x-axis is almost zero on the boundary lines A and D, and becomes larger toward the central line B-B. The magnitude of the field component $\vec{E}_{zx}$ is greatest on the boundary lines A and D, and it is reduced toward the central line B-B.

The magnitude of the elastic restoring force from the aligning treatment is constant on the x-axis regardless of position.

Accordingly, as illustrated in FIG. 14, the tilt angle of the liquid crystal molecule is almost zero on the boundary lines A and D, and decreases toward the central lines C and B. Therefore, the tilt angle of the liquid crystal molecules has a similar distribution to the angle θE made by the field component $\vec{E}_{zx}$ with the x-axis, although the tilt angle varies more smoothly than the angle θE.

When voltages are applied to the two electrodes 191 and 131, the liquid crystal molecules are re-arranged, creating the twist angle and the tilt angle. The transmittance of the incident light varies due to the variation of the twist angle and the tilt angle. On the boundary lines A and D, there is little variation in the tilt angle along the z-axis, but the twist angle varies a large amount. On the central lines B and C, there is little variation in the twist angle along the z-axis, and there is little variation in the tilt angle. Accordingly, both the twist angle and the tilt angle vary in the region between the boundary lines A and D and the central lines B and C. As a result, a transmittance curve as a function of position has a similar shape to the electrical lines of force.

As shown in FIG. 3, the liquid crystal molecules 310 respectively corresponding to the upper and lower branches 191a1, 191b 1, 191a2, and 191b2 of the first and second sub-pixel electrodes 191a and 191b are aligned with an initial twist angle ØS with respect to the upper and lower branches 191a1, 191b 1, 191a2, and 191b2 of the first and second sub-pixel electrodes 191a and 191b.

The initial twist angle ØS is defined by the angle between the rubbing direction R and the vertical direction S of the upper or the lower branches of the branch electrodes 191a. The initial twist angle ØS is in the range of about 0-10 degrees.

The liquid crystal molecules 310 corresponding to the upper branches 191a2 and 191b2 of the first and second sub-pixel electrodes 191a and 191b are rotated in a counter-clockwise direction by the initial twist angle ØS after the application of a voltage. The liquid crystal molecules 310 corresponding to the lower branches 191a1 and 191b 1 of the first and second sub-pixel electrodes 191a and 191b are rotated in the clockwise direction by the initial twist angle ØS after the application of the voltage. Accordingly, since two domains of liquid crystal molecules with different rotation directions are made, the lateral visibility and viewing angle are improved.

The liquid crystal layer 3 may have a negative optical anisotropy. Because the liquid crystal molecules are vertically realigned with respect to the direction of the electric field formed between the pixel electrodes 191 and the common electrodes 131, the liquid crystal molecules are vertically twisted with respect to the vertical direction of the upper and lower branches 191a 1, 191b1, 191a2, and 191b2 of the pixel electrodes 191. The liquid crystal molecules have an initial twist angle ØS to determine the twist direction of the liquid crystal molecules.

FIGS. 15 to 18 are layout views of a TFT array panel for an LCD according to an exemplary embodiment of the present invention.

A plurality of gate lines 121 including gate electrodes 124 and end portions 129, a plurality of common electrodes 131, and a plurality of common electrode lines 125 for connecting the common electrodes 131 are formed on a substrate 110, and a gate insulating layer 140, a plurality of semiconductors 154, and a plurality of ohmic contact islands 163 and 165 are formed thereon. A plurality of data lines 171 including source electrodes 173 and end portions 179 and a plurality of drain electrodes 175 are formed on the ohmic contact islands 163 and 165, and a passivation layer 180 is formed thereon. A plurality of contact holes 181, 182, and 185 are provided at the passivation layer 180 and the gate insulating layer 140. A plurality of pixel electrodes 191 and a plurality of contact assistants 81 and 82 are formed on the passivation layer 180.

Figure 15:
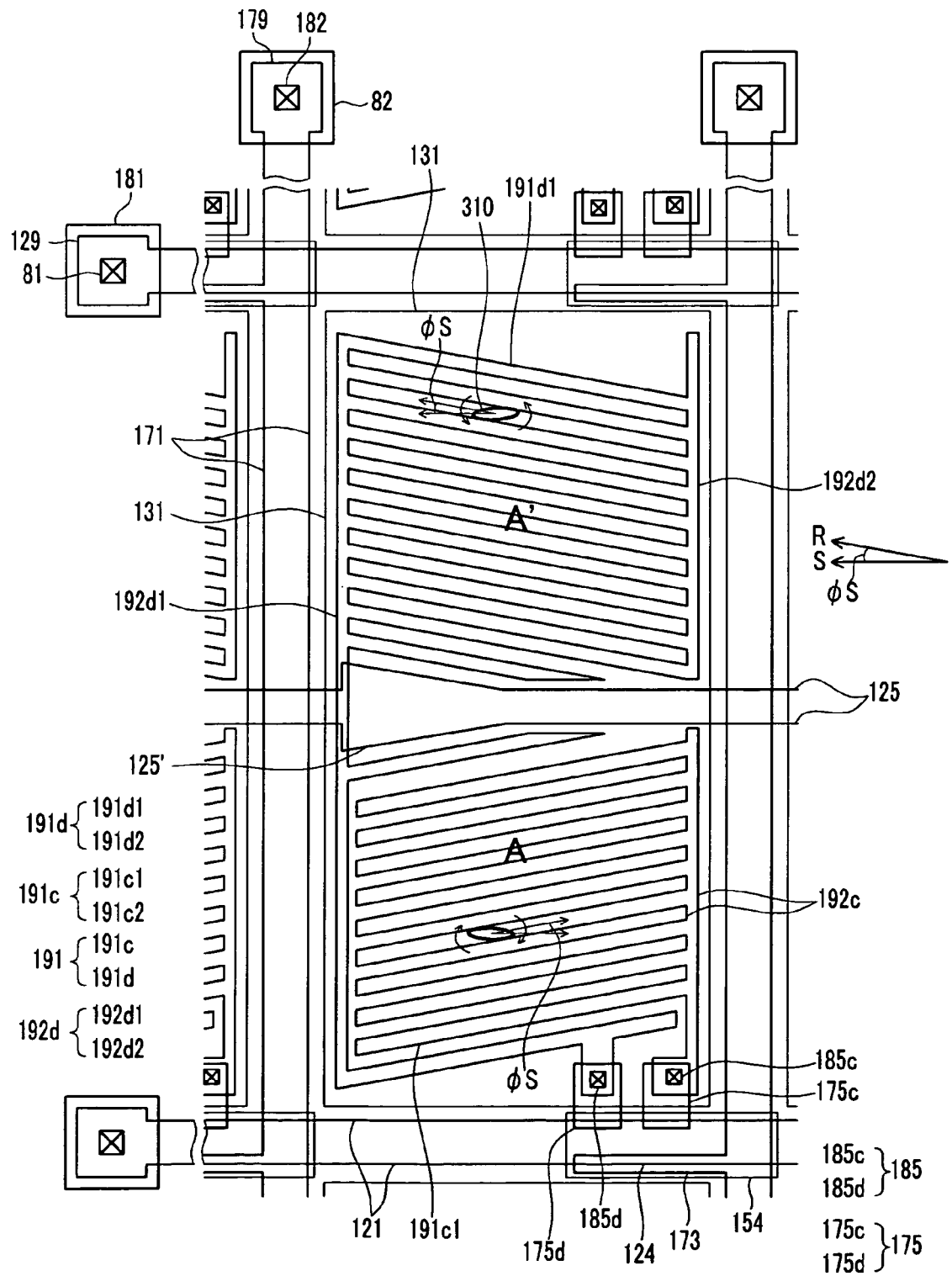
FIGS. 15 to 18 are layout views of a TFT array panel for an LCD according to another exemplary embodiment of the present invention.

In a thin film transistor array panel according to an exemplary embodiment of the invention shown in FIG. 15, the pixel electrodes 191 include a first sub-pixel electrode 191c and a second sub-pixel electrode 191d that are extended in a transverse direction and are separated from each other.

Most of the first and second sub-pixel electrodes 191c and 191d are respectively disposed in the lower and upper portions bisecting the area enclosed by the gate lines 121 and the data lines 171 with the common electrode lines 125.

Each first sub-pixel electrode 191c that is connected to a first drain electrode 175c through a contact hole 185c includes a plurality of lower branch electrodes 191c 1. The lower branch electrodes 191c1 are set with a predetermined angle ØS with respect to the gate lines 121. The connections 192c for connecting the lower branch electrodes 191c 1 are disposed adjacent to the right data lines 171.

Each second sub-pixel electrode 191d that is connected to a second drain electrode 175d through a contact hole 185d includes a plurality of upper branch electrodes 191d 1. The upper branch electrodes 191d 1 are set to a predetermined angle ØS with respect to the gate lines 121. The branch electrodes 191c1 have a symmetric structure with respect to the common electrode line 125. The first and second connections 192d1 and 192b2 connect the upper branch electrodes 191d 1 and are respectively disposed adjacent to data lines 171. The first connection 192d1 includes transverse and vertical extensions that are extended according to the gate line 121 and the data line 171. The transverse extension is extended under the second drain electrode 175d and is parallel to the lower branch electrodes 191c1. Portions of the first and second connections 192c1 and 192c2 that respectively overlap the first and second drain electrodes 175c and 175d are enlarged.

Figure 16:
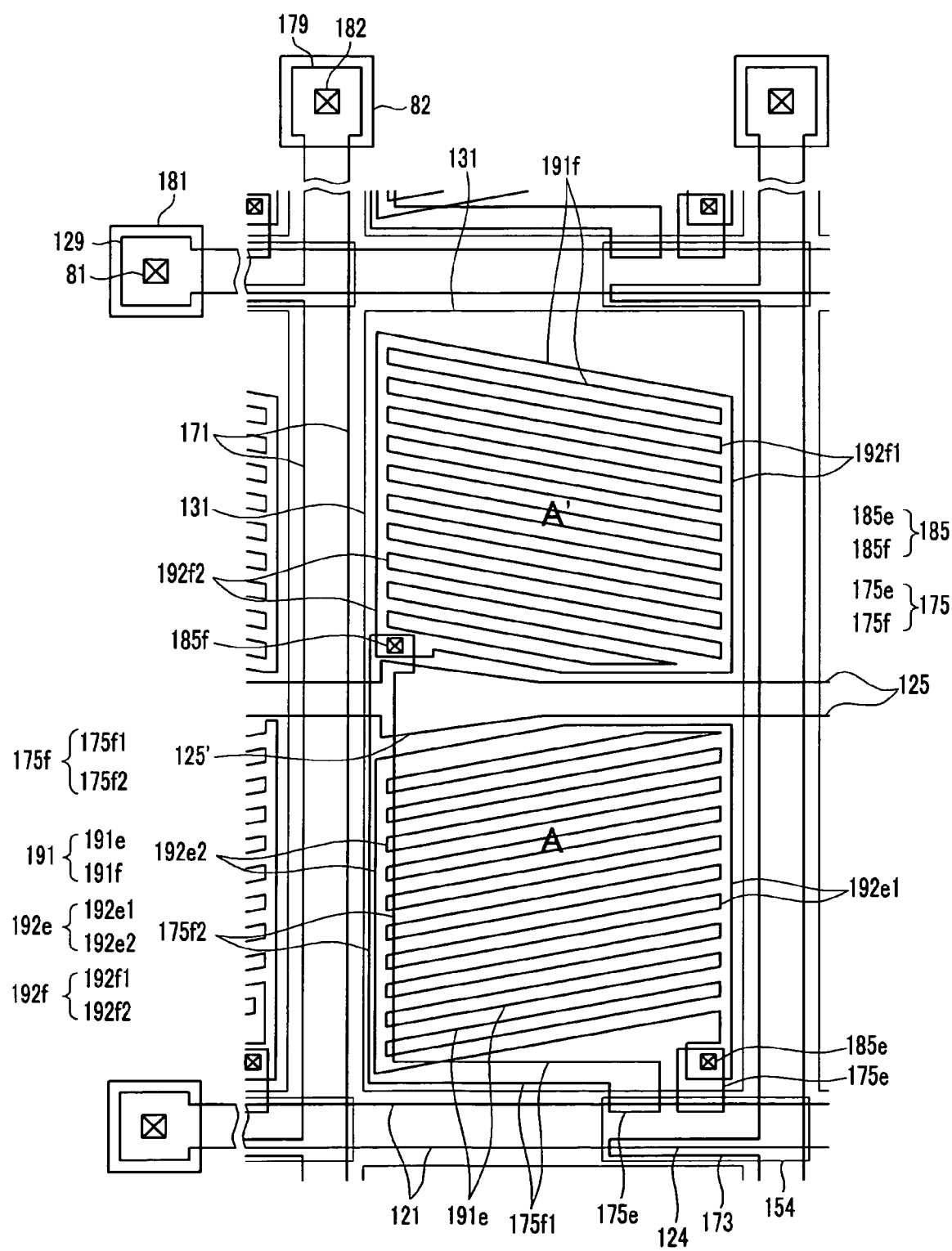
Figure 17:
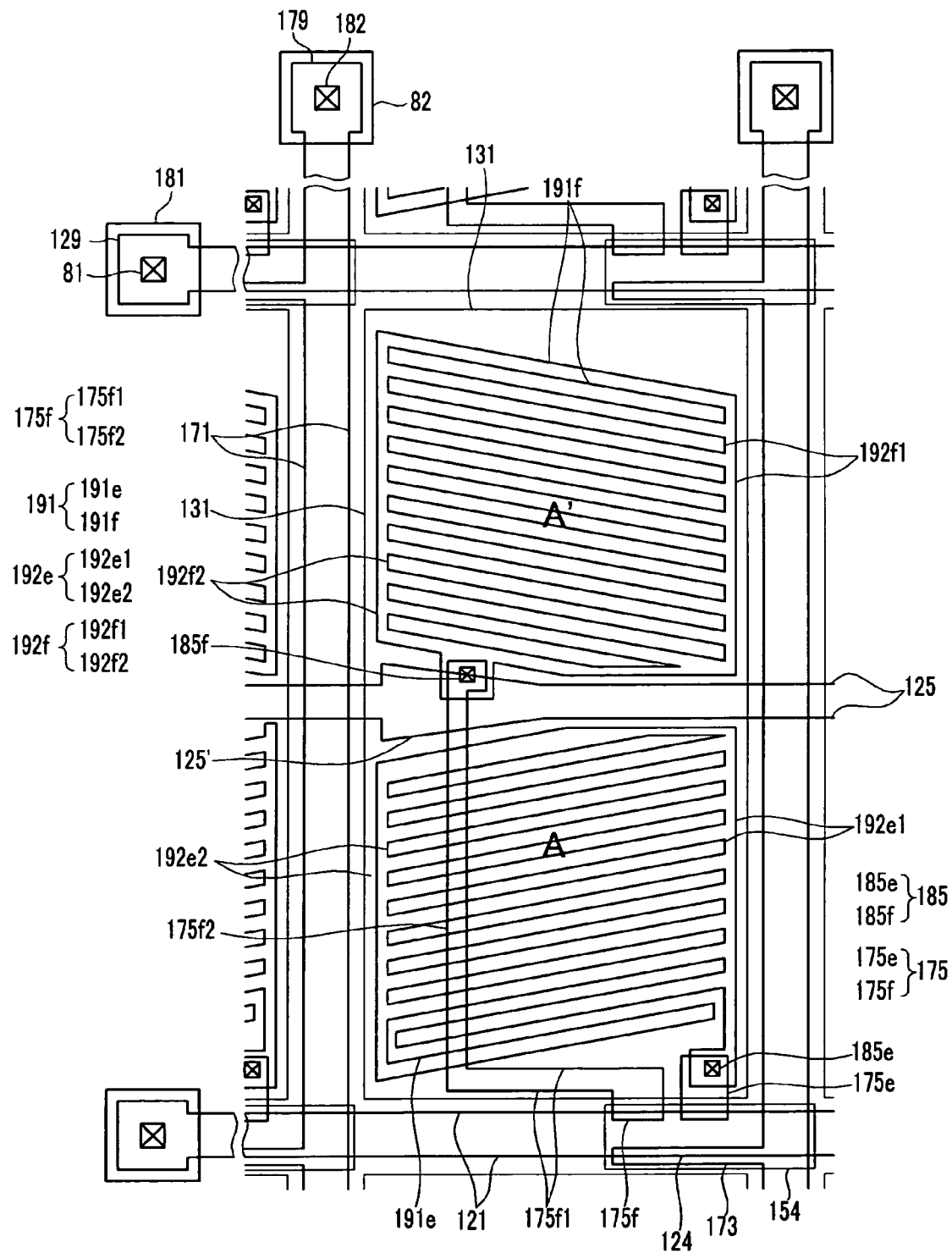

In a thin film transistor array panel according to an exemplary embodiment of the invention as shown in FIGS. 16 and 17, the pixel electrodes 191 include a first sub-pixel electrode 191e and a second sub-pixel electrode 191f that are extended in a transverse direction and are separated from each other.

The first and second sub-pixel electrodes 191e and 191f are respectively disposed in the lower and upper portions bisecting the area enclosed by the gate lines 121 and the data lines 171 with the common electrode lines 125.

Each first sub-pixel electrode 191e that is connected to a first drain electrode 175e through a contact hole 185e includes a plurality of lower branch electrodes 191e1 that are set to a predetermined angle ØS with respect to the gate lines 121. The first and second connections 192e1 and 192e2 connect the side ends of the lower branch electrodes 191e1 and are respectively disposed adjacent to both data lines 171.

Each second sub-pixel electrode 191f that is connected to a second drain electrode 175f through a contact hole 185f includes a plurality of upper branch electrodes 191f1 that are set to a predetermined angle ØS with respect to the gate lines 121. The lower branch electrodes 191e1 have a symmetric structure with respect to the common electrode line 125. The first and second connections 192d1 and 192b2 respectively connect the right and left ends of the upper branch electrodes 191d1 and are respectively disposed adjacent to both data lines 171.

The second drain electrode 175f includes transverse and vertical extensions 175f1 and 175f2 extended according to the gate line 121 and the data line 171, and the end portion of the vertical extension 175f2 is connected to the second connection 192f2 through a contact hole 185f.

As shown in FIG. 16, the vertical extension 175f2 of the second drain electrode 175f adjacent to the data line 171 overlaps with the second connection 192e2 of the first sub-pixel electrode 191e, but the vertical extension 175f2 of the second drain electrode 175f adjacent to the data line 171 does not overlap the second connection 192e2 of the first sub-pixel electrode 191e.

Figure 18:
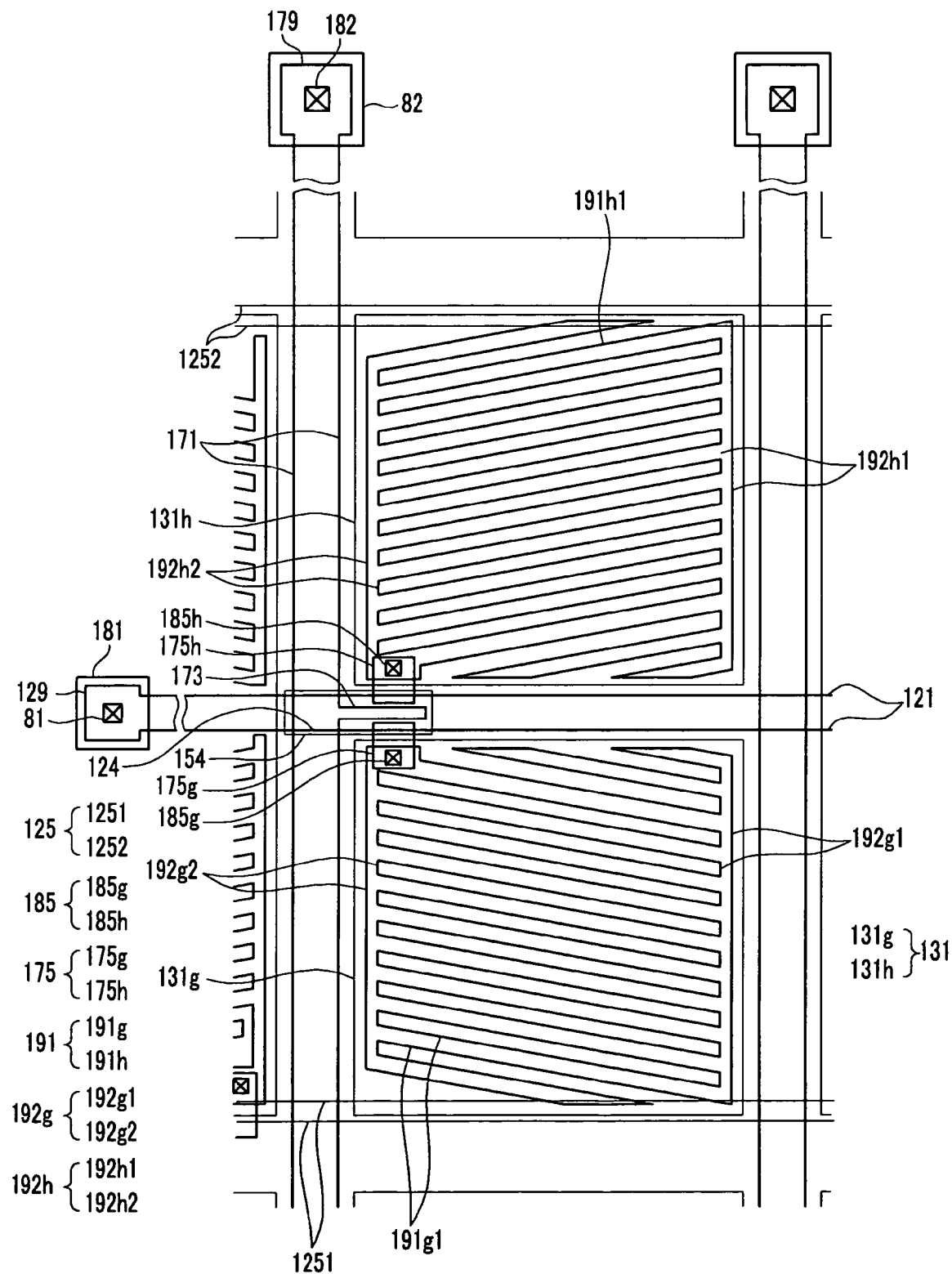

As shown in FIG. 18, in an exemplary embodiment according to the present invention, the first and second sub-pixel electrodes 191g and 191h are divided by the center portion of the gate lines 121, and are respectively disposed in the upper and lower sides of the area enclosed by the gate lines 121 and the data lines 171. The gate lines 121 are disposed in the center portion between the first and second sub-pixel electrodes 191g and 191h, and first and second drain electrodes 175g and 175g are disposed in the upper and lower sides of the gate electrode 124.

The common electrodes 131 include lower and upper common electrodes 131g and 131h respectively disposed in the upper and lower sides of the gate lines 121, and the common electrode lines 125 include an upper common electrode line 1252 connecting the upper common electrodes 131h and a lower common electrode line 1251 connecting the lower common electrodes 131g.

Each first sub-pixel electrode 191g that is connected to a first drain electrode 175g through a contact hole 185g includes a plurality of lower branch electrodes 191g1 that are set to a predetermined angle ØS with respect to the gate lines 121. The first and second connections 192g1 and 192g2 connect the side ends of the lower branch electrodes 191g1 and are respectively disposed adjacent to both data lines 171.

Each second sub-pixel electrodes 191h that is connected to a second drain electrode 175g through a contact hole 185h includes a plurality of upper branch electrodes 191h1 that are set to a predetermined angle ØS with respect to the gate lines 121. The lower branch electrodes 191g1 have a symmetric structure with respect to the gate line 121 first and second connections 192h1 and 192h2 respectively connect the side ends of the upper branch electrodes 191h1 and are respectively disposed adjacent to both data lines 171.

FIGS. 19 to 22 are layout views of a TFT array panel for an LCD according to an exemplary embodiment of the present invention.

A plurality of gate lines 121 including gate electrodes 124 and end portions 129, a plurality of common electrodes 131, and a plurality of common electrode lines 125 for connecting the common electrodes 131 are formed on a substrate 110, and a gate insulating layer 140, a plurality of semiconductors 154, and a plurality of ohmic contact islands 163 and 165 are formed thereon. A plurality of data lines 171 including source electrodes 173 and end portions 179 and a plurality of drain electrodes 175 are formed on the ohmic contact islands 163 and 165, and a passivation layer 180 is formed thereon. A plurality of contact holes 181, 182, and 185 are provided on the passivation layer 180 and the gate insulating layer 140. A plurality of pixel electrodes 191 and a plurality of contact assistants 81 and 82 are formed on the passivation layer 180.

Figure 19:
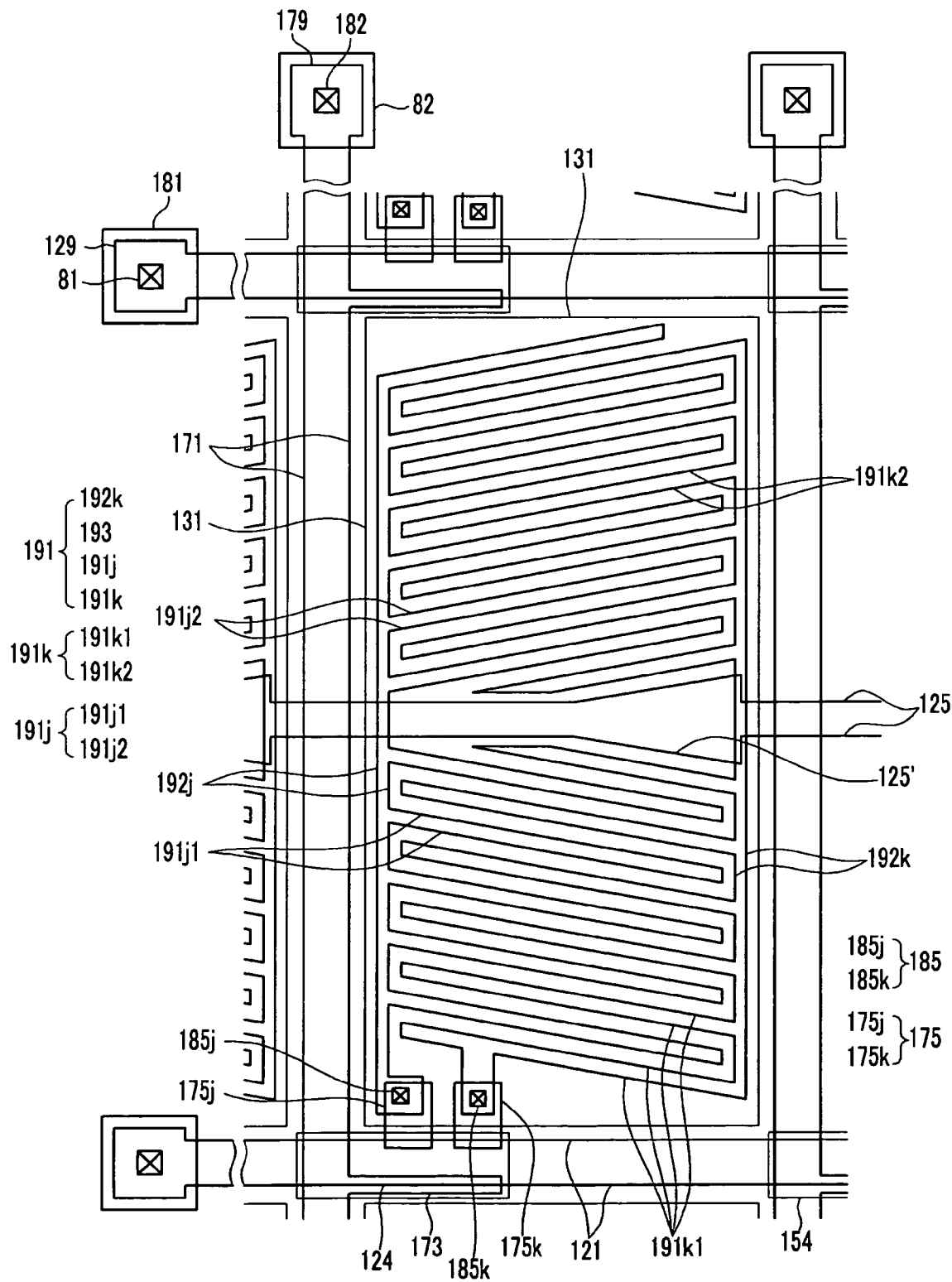
FIGS. 19 to 22 are layout views of a TFT array panel for an LCD according to another exemplary embodiment of the present invention.
Figure 20:
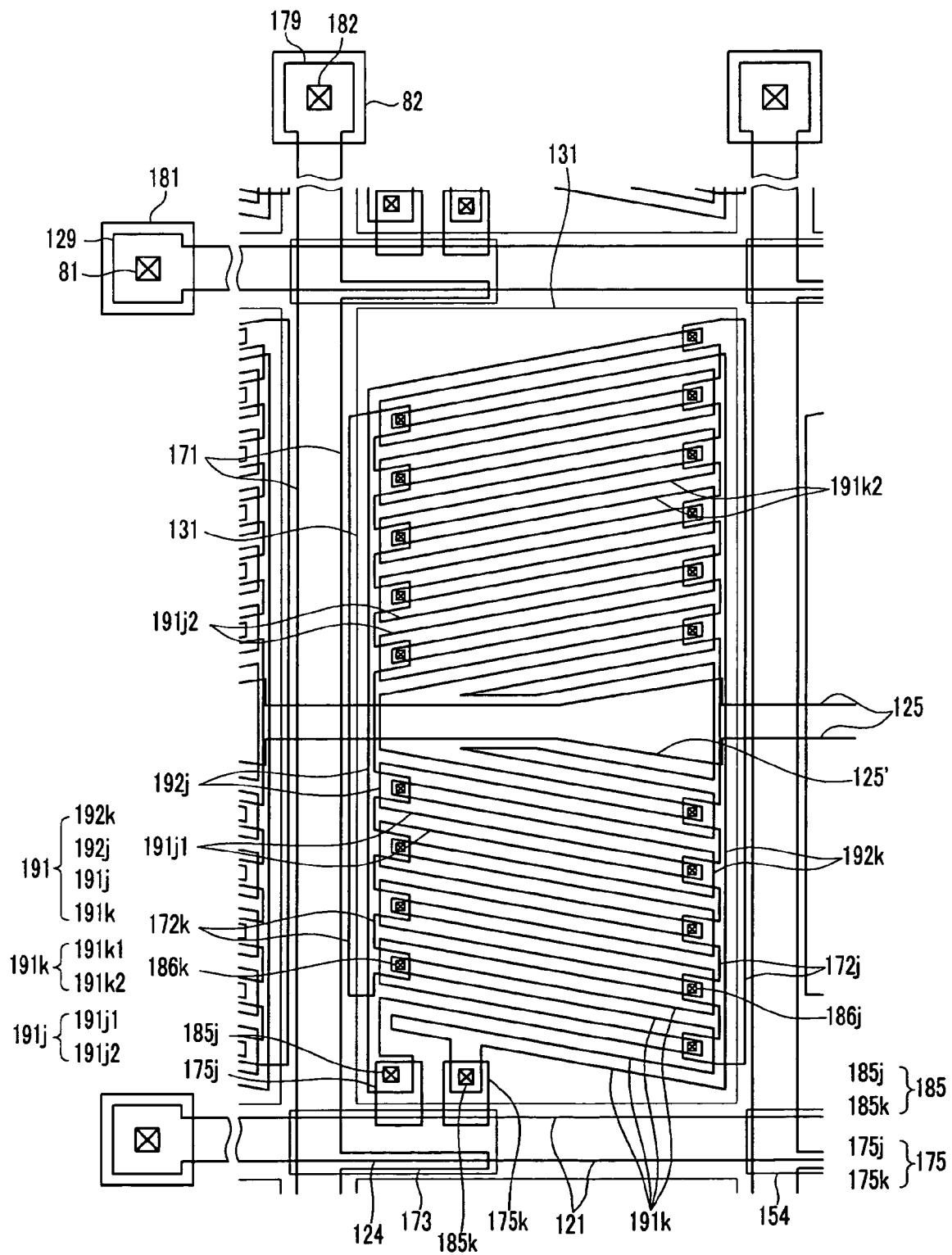

As shown in FIG. 19, first and second sub-pixel electrodes 191j and 191k that are separated from each other have a symmetric structure with respect to the common electrode line 125 bisecting the area enclosed by the gate line 121 and the data line 171.

Each first sub-pixel electrode 191j that is connected to a first drain electrode 175j through a contact hole 185j includes a plurality of lower and upper branch electrodes 911j1 and 191j2 that are set to a predetermined angle ØS with respect to the gate lines 121. The lower and upper branch electrodes have a symmetric structure with respect to the common electrode line 125. The connections 192j connect the left side ends of the lower and upper branch electrodes 191j1 and 191j2 and are respectively disposed adjacent the left data line 171.

Each first sub-pixel electrode 191k that is connected to a second drain electrode 175k through a contact hole 185k includes a plurality of lower and upper branch electrodes 191k1 and 191k2 that are set to a predetermined angle ØS with respect to the gate lines 121. The lower and upper branch electrodes 191k1 and 191k2 have a symmetric structure with respect to the common electrode line 125. The connections 192j connect the right side ends of the lower and upper branch electrodes 191k1 and 191k2 and are respectively disposed adjacent to the right data line 171.

However, the thin film transistor array panel includes first and second assistants 172j and 172k. The first assistant 172j overlaps the connection 192k of the second sub-pixel electrode 191k, and is connected to the end portions of the upper and lower branch electrodes 191j1 and 191j2 of the first sub-pixel electrode 191j through a contact hole 186j. The first assistant 172j has a plurality of protrusions connected to the upper and lower branch electrodes 191*j*1 and 191*j*2 of the first sub-pixel electrode 191*j*, and are extended from the first assistant 172*j*.

The second assistant 172*k* overlaps the connection 192*j* of the first sub-pixel electrode 191*j*, and is connected to the end portions of the upper and lower branch electrodes 191*k*1 and 191*k*2 of the second sub-pixel electrode 191*k* through a contact hole 186*k*. The second assistant 172*k* has a plurality of protrusions connected to the upper and lower branch electrodes 191*k*1 and 191*k*2 of the second sub-pixel electrode 191*k* and are extended from the second assistant 172*k*.

Figure 21:
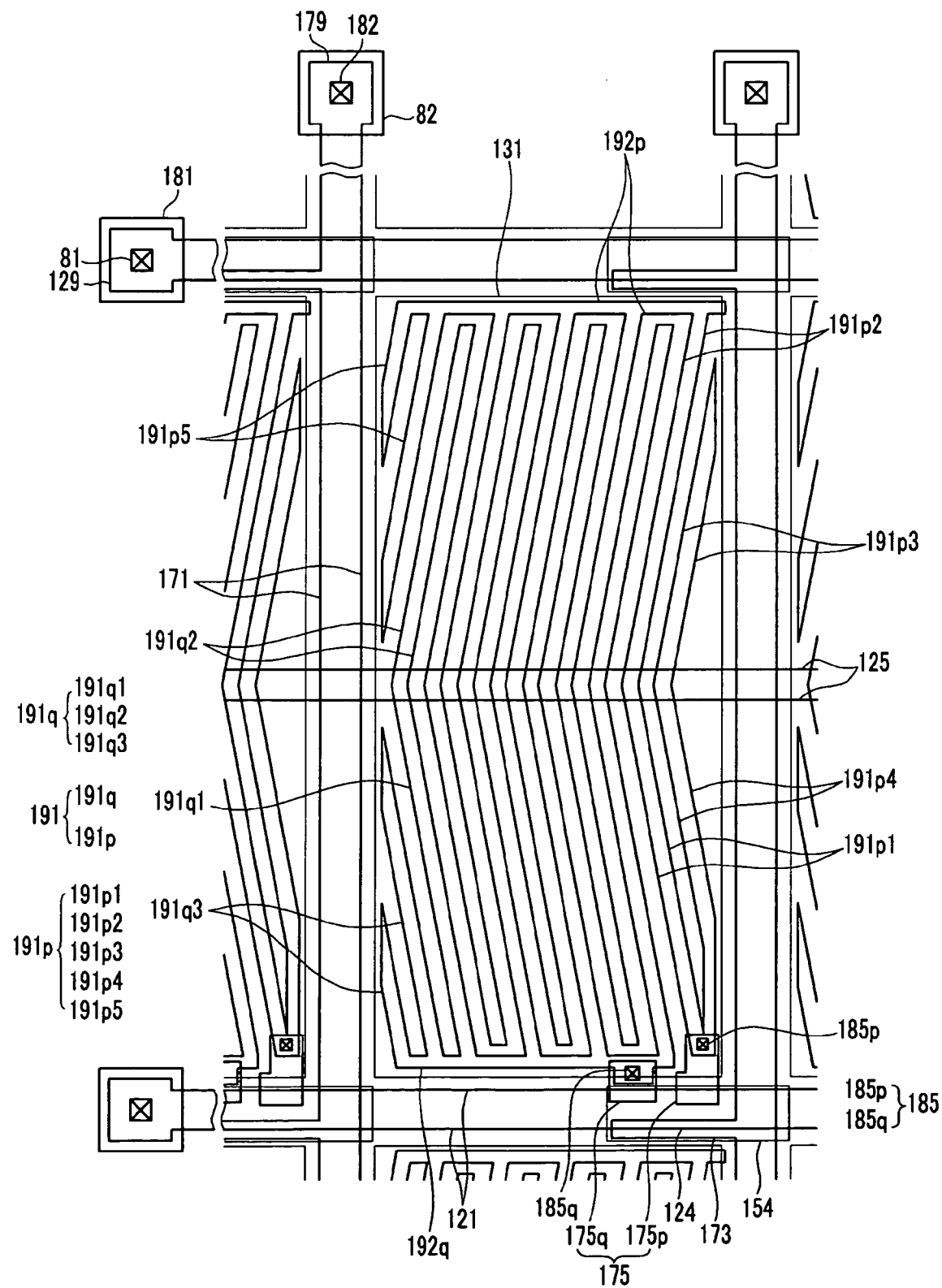

As shown in FIG. 21, in a thin film transistor array panel according to an exemplary embodiment of the invention, pixel electrodes 191 extend substantially in a vertical direction with inversion symmetry with respect to the common electrode lines 125, and include a first sub-pixel electrode 191*p* and a second sub-pixel electrode 191*q* that are separated from each other.

The first sub-pixel electrode 191*p* includes a plurality of upper and lower branch electrodes 191*p*1 and 191*p*2 that are curved at the center portions with a predetermined angle. The upper and lower branch electrodes 191*p*1 and 191*p*2 have inversion symmetry with respect to a center line of the common electrodes 131. The common electrodes 131 are parallel to the gate lines 121. The upper connections 192*p* are for respectively connecting the upper portion of the upper and lower branch electrodes 191*p*1 and 191*p*2 and are disposed closely to the upper gate line 121. The first sub-pixel electrode 191*p* includes a plurality of right branch electrodes 191*p*3 and 191*p*4 that are parallel to the upper and lower branch electrodes 191*p*1 and 191*p*2. The plurality of right branch electrodes 191*p*3 and 191*p*4 are connected to the right external part of the upper and lower branch electrodes 191*p*1 and 191*p*2. A plurality of left branch electrodes 191*p*5 are parallel to the upper branch electrodes 191*p*2 and are connected to the left external part of the upper branch electrodes 191*p*2.

The second sub-pixel electrode 191*q* includes a plurality of upper and lower branch electrodes 191*q*1 and 191*q*2 that are curved at the center portions with a predetermined angle. and the upper and lower branch electrodes have inversion symmetry with respect to a center line of the common electrodes 131. The common electrodes are parallel to the gate lines 121. The lower connections 192*q* are for respectively connecting the lower portion of the upper and lower branch electrodes 191*q*1 and 191*q*2 and are disposed close to the lower gate line 121. The second sub-pixel electrode 191*q* includes a plurality of left branch electrodes 191*q*3 that are parallel to the lower branch electrodes 191*q*1 and are connected to the left external part of the lower branch electrodes 191*q*1.

Figure 22:
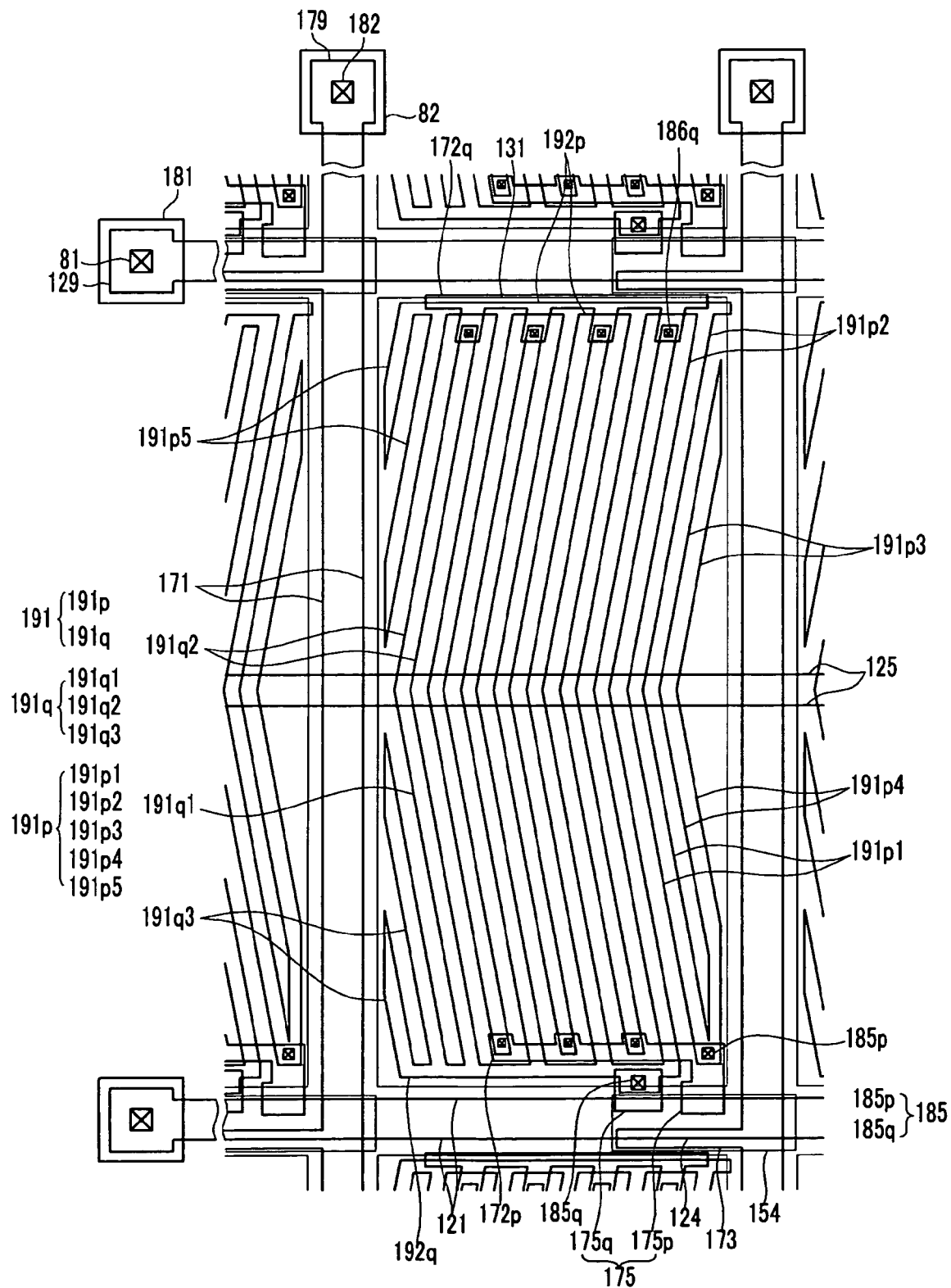

The thin film transistor array panel includes first and second assistants 172*p* and 172*q* as shown in FIG. 22. The first assistant 172*p* is disposed close to the connection 192*q* of the second sub-pixel electrode 191*q*, and is connected to the end portions of the lower branch electrodes 191*p*1 of the first sub-pixel electrode 191*p* through a contact hole 185*p* and a first drain electrode 175*p*.

The second assistant 172*q* overlaps the connection 192*p* of the first sub-pixel electrode 191*p* and is connected to the end portions of the upper branch electrodes 191*q*2 of the second sub-pixel electrode 191*q* through a contact hole 186*q*. The second assistant 172*q* has a plurality of protrusions connected to the upper branch electrodes 191*q*2 of the second sub-pixel electrode 191*q* and are extended from the second assistance 172*q*.

In the thin film transistor array panels shown in FIGS. 19 to 22, even if one of the first and second sub-pixel electrodes 191*j*, 191*k*, 191*p*, and 191*q* is shorted to the common electrodes 131, the other is normally driven. The sub-pixel electrode that is shorted to the common electrode 131 is supplied with the common voltage, so the shorted sub-pixel electrode is operated as the common electrode 131. Accordingly, a liquid crystal display of an in-plane switching mode in which the common electrodes and the pixel electrodes are alternatively arranged is formed. In this structure, even if the shorted sub-pixel electrode is not repaired, transmittance of 80 percent may be achieved in comparison with that of normal pixels such that off-pixel defects are removed.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:
   a substrate;
   a plurality of gate lines formed on the substrate;
   a plurality of common electrodes formed on the substrate and made of transparent material;
   a plurality of data lines intersecting the gate lines;
   a plurality of thin film transistors connected to the data lines and the gate lines; and
   a plurality of pixel electrodes connected to the thin film transistors and overlapping the common electrodes,
   wherein the pixel electrodes include a first sub-pixel electrode separated a distance from a second sub-pixel electrode.

2. The thin film transistor array panel of claim 1, wherein the thin film transistors comprise a first drain electrode connected to the first pixel electrode and a second drain electrode connected to the second pixel electrode.

3. The thin film transistor array panel of claim 1, wherein the first and second sub-pixel electrodes comprise a plurality of branch electrodes having a parallel arrangement.

4. The thin film transistor array panel of claim 3, wherein the common electrodes have a continuous surface between the branch electrodes.

5. The thin film transistor array panel of claim 3, wherein the branch electrodes of the first and second sub-pixel electrodes are disposed in different areas.

6. The thin film transistor array panel of claim 5, wherein the first and second sub-pixel electrodes are disposed on both sides of the gate lines.

7. The thin film transistor array panel of claim 3, wherein the branch electrodes of the first sub-pixel electrode are alternatively arranged with the branch electrodes of the second sub-pixel electrode.

8. The thin film transistor array panel of claim 3, wherein the branch electrodes of the first and second sub-pixel electrodes are curved with respect to the gate lines or the data lines.

9. The thin film transistor array panel of claim 8, wherein the branch electrodes of the first and second sub-pixel electrodes have inversion symmetry with respect to center lines of the common electrodes and are parallel to the gate lines.

10. The thin film transistor array panel of claim 3, further comprising a plurality of common electrode lines connecting the common electrodes.

* * * * *